United States Patent
Allen et al.

(10) Patent No.: US 8,989,550 B2
(45) Date of Patent: Mar. 24, 2015

(54) CABLE ANCHORING SYSTEM FOR A FIBER OPTIC ENCLOSURE

(71) Applicant: Tyco Electronics Corporation, Berwyn, PA (US)

(72) Inventors: Barry Wayne Allen, Siler City, NC (US); James Anthony Croce, Coats, NC (US); William Alan Carrico, Raleigh, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 13/886,389

(22) Filed: May 3, 2013

(65) Prior Publication Data

US 2013/0294739 A1 Nov. 7, 2013

Related U.S. Application Data

(60) Provisional application No. 61/642,707, filed on May 4, 2012.

(51) Int. Cl.
 *G02B 6/00* (2006.01)
 *G02B 6/44* (2006.01)
(52) U.S. Cl.
 CPC ............ *G02B 6/4454* (2013.01); *G02B 6/4444* (2013.01)
 USPC ........................................................ 385/135
(58) Field of Classification Search
 CPC ... G02B 6/4442; G02B 6/4444; G02B 6/4477
 USPC ........................................................ 385/135
 See application file for complete search history.

(56) References Cited

U.S. PATENT DOCUMENTS

| 5,426,715 A | 6/1995 | Moisson et al. |
| 5,764,844 A | 6/1998 | Mendes |

(Continued)

FOREIGN PATENT DOCUMENTS

| EP | 0 752 118 B1 | 6/1999 |
| JP | 2005-17913 | 1/2005 |
| WO | WO 2010/008718 A2 | 1/2010 |

OTHER PUBLICATIONS

International Search Report and Written Opinion for PCT/US2013/039183 mailed Aug. 26, 2013.

(Continued)

*Primary Examiner* — Ryan Lepisto
(74) *Attorney, Agent, or Firm* — Merchant & Gould P.C.

(57) ABSTRACT

A cable sealing and cable anchoring system has a primary sealant assembly that includes a primary volume of sealant that defines primary through-ports. The primary sealant assembly includes a primary actuator for pressurizing the primary volume of sealant. The system also has a secondary cable tube that mounts within one of the primary cable through-ports and a secondary cable sealant assembly that mounts within a first end of the secondary cable tube. The secondary cable sealant assembly includes a secondary sealant volume that defines secondary cable through-ports. The secondary cable sealant assembly also includes a secondary actuator for pressurizing the secondary sealant volume. The system further has a cable anchoring assembly for anchoring a strength member of a secondary cable to the secondary cable tube. The cable anchoring assembly is supported by the secondary cable tube adjacent the second end of the secondary cable tube.

17 Claims, 29 Drawing Sheets

(56) References Cited

U.S. PATENT DOCUMENTS

| | | |
|---|---|---|
| 5,777,268 A | 7/1998 | Allen et al. |
| 5,789,707 A | 8/1998 | Damm et al. |
| 5,792,991 A | 8/1998 | Nolf |
| 6,150,608 A | 11/2000 | Wambeke et al. |
| 6,497,414 B1 | 12/2002 | Roosen |
| 7,736,165 B2 | 6/2010 | Bukovnik et al. |
| 7,780,173 B2 | 8/2010 | Mullaney et al. |
| 2009/0103877 A1 | 4/2009 | Kluwe et al. |
| 2009/0304341 A1 | 12/2009 | Shimirak et al. |
| 2010/0054689 A1* | 3/2010 | Mullaney et al. ............ 385/135 |

OTHER PUBLICATIONS

FOSC 450, Fiber Optic Splice Closure Ordering Guide, 2004, 26 pages.

FIST/FOSC-O/RSKG, 2 pages, 2011.

* cited by examiner

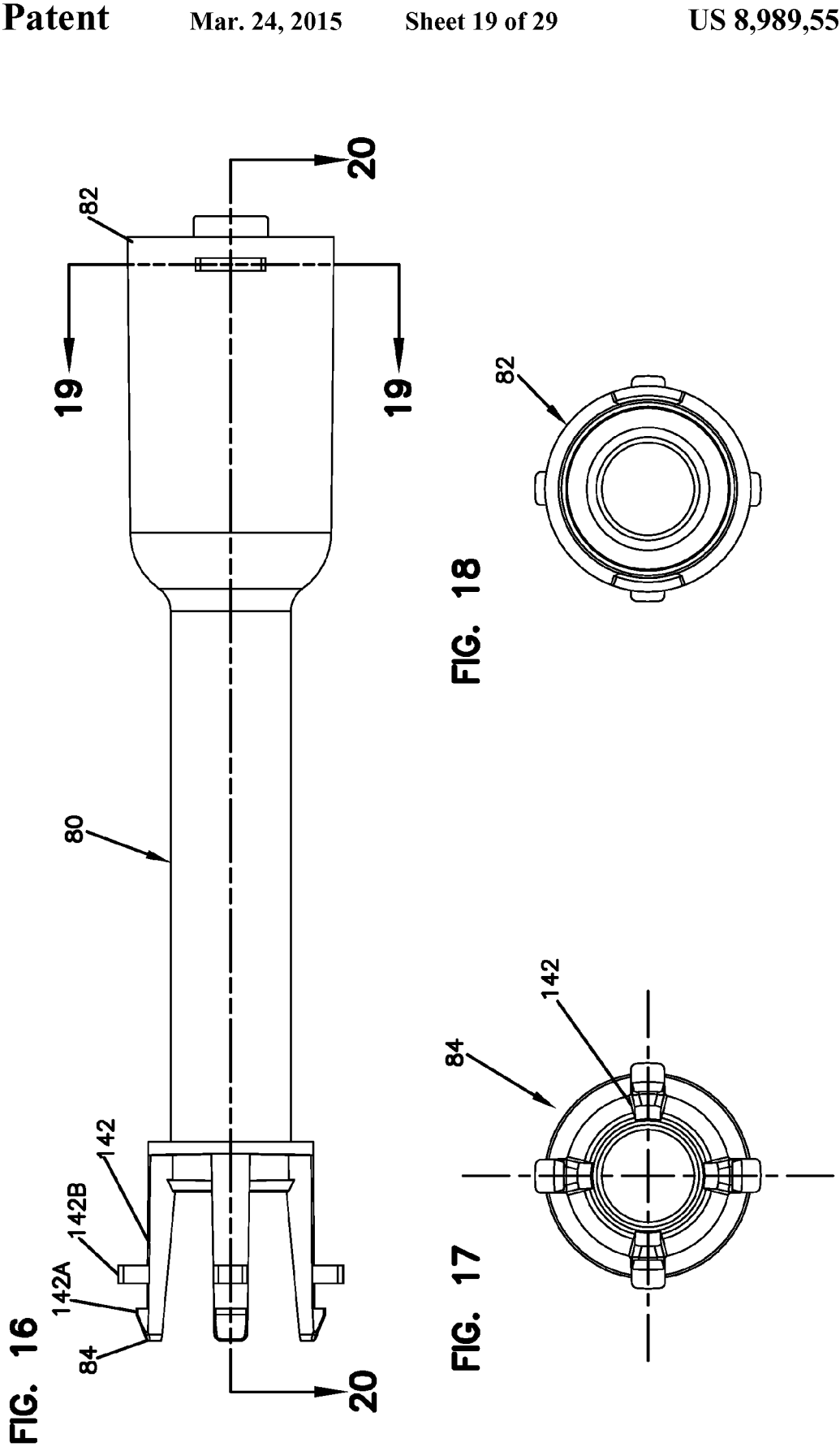

CABLE ANCHORING SYSTEM FOR A FIBER OPTIC ENCLOSURE

CROSS-REFERENCE TO RELATED APPLICATION

This application claims the benefit of U.S. Provisional Patent Application Ser. No. 61/642,707, filed May 4, 2012, which application is hereby incorporated by reference in its entirety.

TECHNICAL FIELD

The present disclosure relates generally to fiber optic enclosures and related equipment. More particularly, the present disclosure relates to fiber optic cable anchoring systems for use with fiber optic equipment such as fiber optic enclosures.

BACKGROUND

Fiber optic communication systems are becoming prevalent in part because service providers want to deliver high band width communication capabilities to customers. Fiber optic communication systems often employ a network of fiber optic cables capable of transmitting large volumes of data and voice signals over relatively long distances. A typical fiber optic network includes a system of trunk fiber optic cables each including a relatively large number of optical fibers. Optical fiber networks also include drop cables that interconnect to fibers of the trunk cables at various locations along the lengths of the trunk cables. The drop cables can be routed from the trunk cables to subscriber locations or to intermediate structures such as drop terminals.

Drop cables are often connected to the optical fibers of trunk cables via splices (e.g., fusion splices or mechanical splices). Splices are often supported within splice trays that are protected from the environment by sealed, re-enterable enclosures. Such enclosures typically include sealed ports through which the trunk cables and drop cables enter the enclosures. One example type of enclosure includes a dome and a base that are interconnected by a clamp. A gel block mounts within the base. The gel block defines a plurality of cable ports for allowing cables to be routed into the enclosure through the base. The cable ports are sealed by pressurizing the gel block with a manual actuator. Plugs are mounted within any of the cable ports that are unused. Example dome-style splice closures are disclosed in U.S. Pat. Nos. 7,780,173; 5,446,823; and 5,323,480.

A typical fiber optic cable includes an optical fiber surrounded by a protective outer jacket. The optical fiber typically includes a glass core and cladding surrounded by one or more layers of protective coating. A typical fiber optic cable also includes a structure for reinforcing the cable with respect to tensile and/or compressive loading. For example, strength members, such as epoxy rods reinforced by glass fibers/rovings, can be incorporated into the cable to provide the cable with reinforcement with regard to both compressive and tensile loading. Other types of cables can include a strength layer formed by strength members such as aramid yarn which provide tensile reinforcement to the cables. When a fiber optic cable is routed into an enclosure, the outer jacket of the fiber optic cable is often stripped away to provide access to the internal optical fiber for splicing or connection to a fiber optic connector. It is a common practice for the fiber optic cable to be anchored to the enclosure such that any loading applied to the cable will be transferred from the cable to the enclosure. In this way, the unjacketed portion of optical fiber within the enclosure is protected from loading. To minimize installation costs, it is desirable for the fiber optic cable anchoring structures of an enclosure to be relatively easy to access and use.

SUMMARY

One aspect of the present disclosure relates to a cable sealing and anchoring system. The cable sealing and anchoring system includes a primary sealant assembly including a primary volume of sealant that defines a plurality of primary through-ports that pass through the primary sealant assembly. The primary sealant assembly also includes a primary actuator for pressurizing the primary volume of sealant. The cable sealing and anchoring system also includes a secondary cable tube that mounts within one of the primary cable through-ports. The secondary cable tube includes a first end and a second end. The cable sealing and anchoring system further includes a secondary cable sealant assembly that mounts within the first end of the secondary cable tube. The secondary cable sealant assembly includes a secondary sealant volume defining a plurality of secondary cable through-ports that extend through the secondary cable sealant assembly. The secondary cable sealant assembly also includes a secondary actuator for pressurizing the secondary sealant volume. The cable sealing and anchoring system further includes a cable anchoring assembly supported by the secondary cable tube adjacent to the second end of the secondary cable tube. The cable anchoring assembly is configured for anchoring a strength member of a secondary cable that has been routed through the secondary cable tube.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventions and inventive concepts upon which the embodiments disclosed herein are based.

BRIEF DESCRIPTION OF THE DRAWINGS

FIG. 11A is an enlarged view of the second end of the cable tube assembly of FIG. 8;

FIG. 11B is a longitudinal cross-sectional view of the second end of the cable tube assembly of FIG. 8;

FIG. 16 is a side view of the secondary cable tube of FIG. 14;

FIG. 17 is an end view of the secondary cable tube of FIG. 14;

FIG. 18 is an opposite end view of the secondary cable tube of FIG. 14;

DETAILED DESCRIPTION

Figure 1:
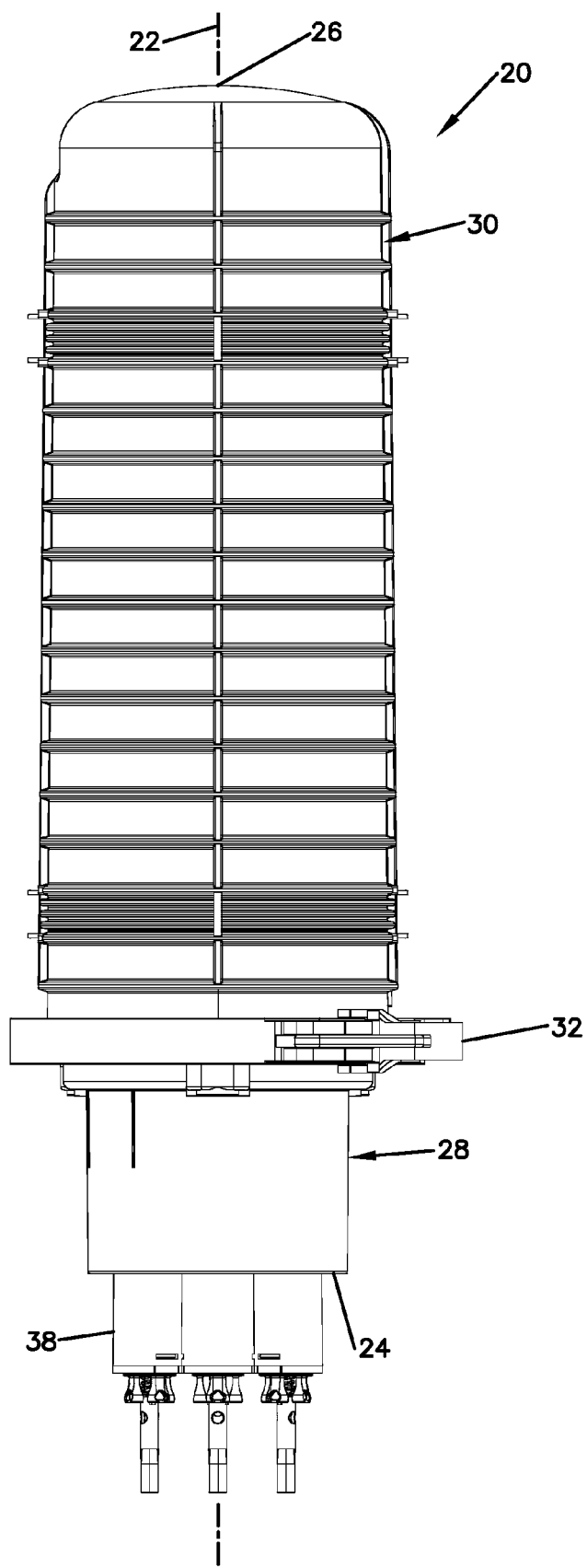
FIG. 1 is a side view of an enclosure in accordance with the principles of the present disclosure.
Figure 2:
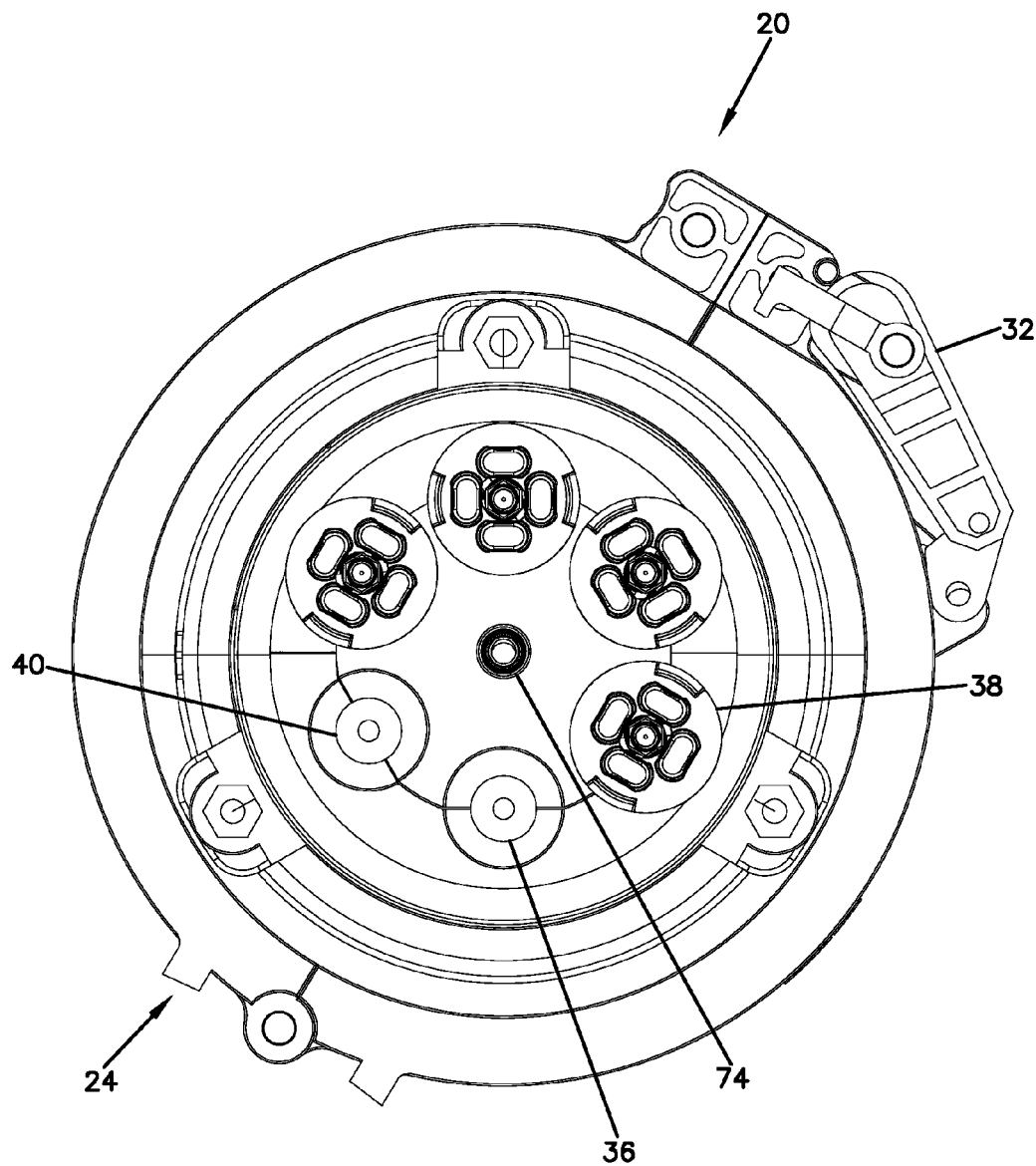
FIG. 2 is a bottom view of the enclosure of FIG. 1.
Figure 3:
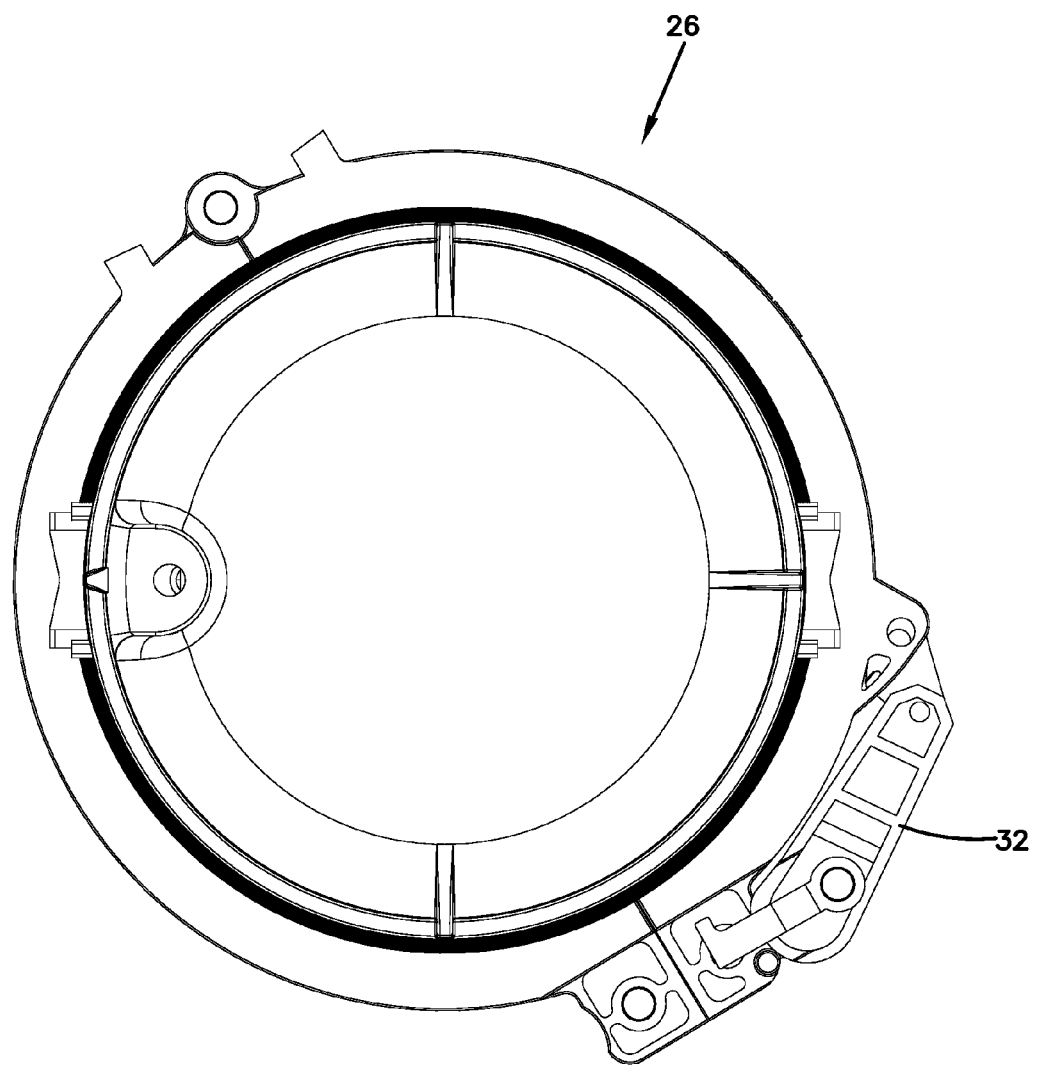
FIG. 3 is a top view of the enclosure of FIG. 1.
Figure 4:
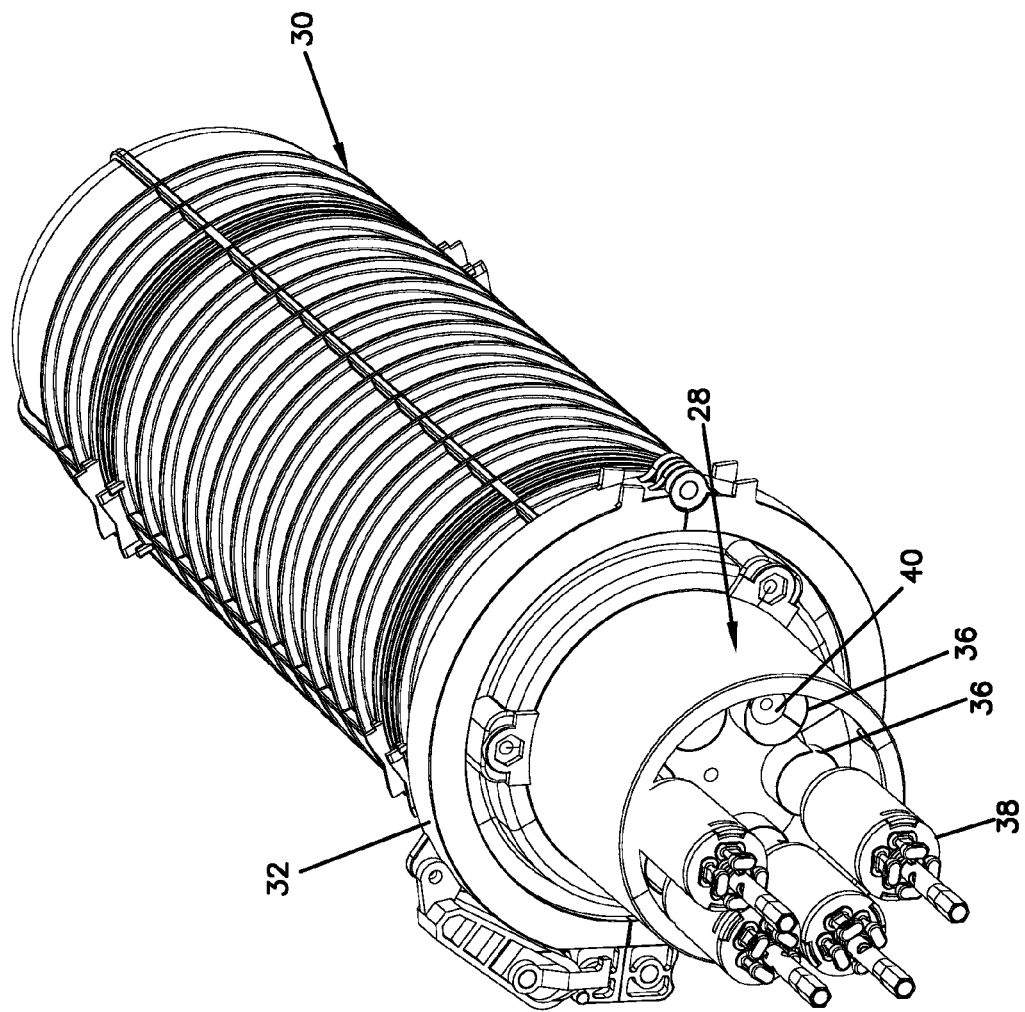
FIG. 4 is a bottom, perspective view of the enclosure of FIG. 1.
Figure 5:
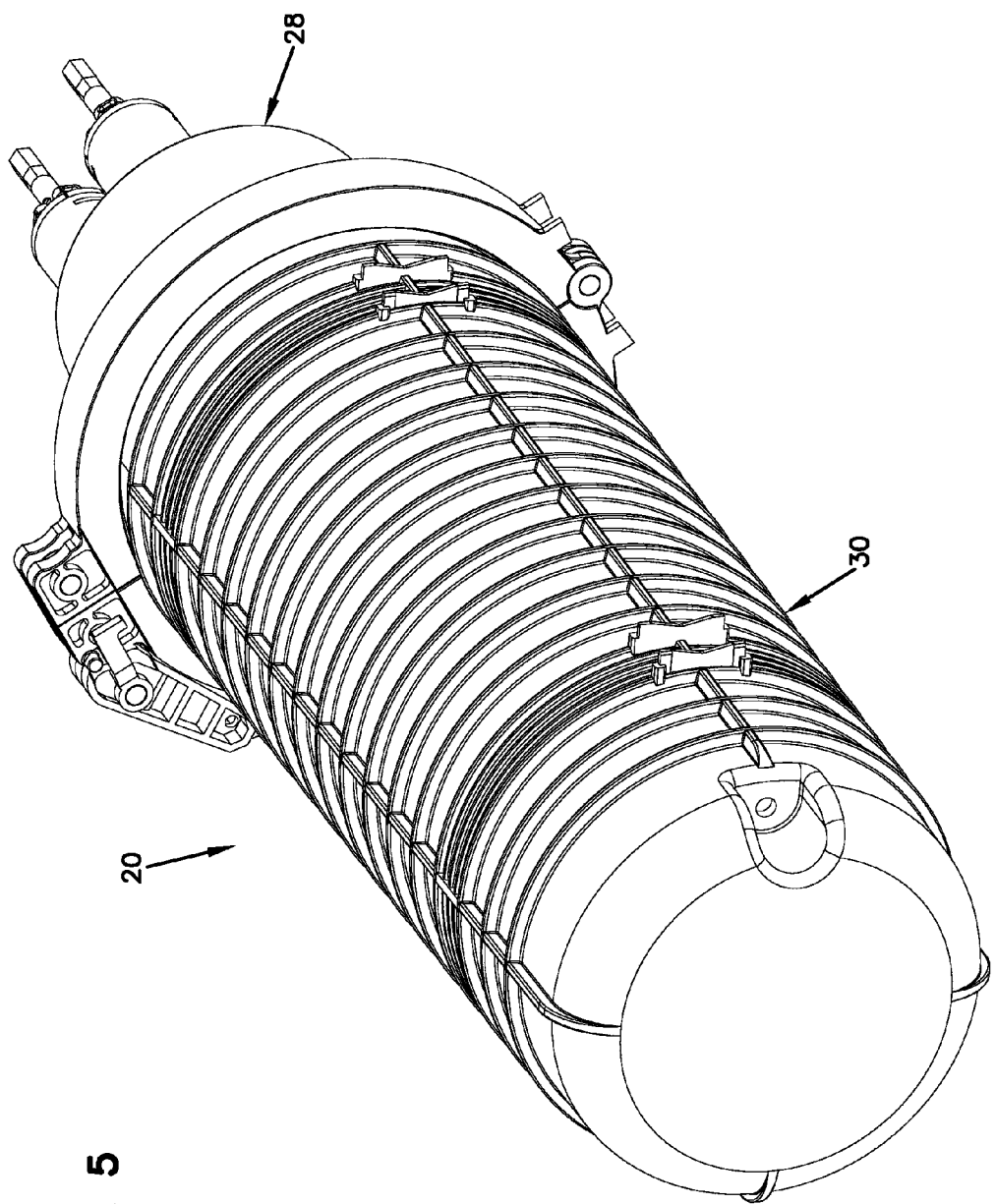
FIG. 5 is a top, perspective view of the enclosure of FIG. 1.

The present disclosure relates generally to cable sealing and anchoring systems for use in enclosures (e.g., fiber optic enclosures, electrical enclosures, aerial enclosures, pedestals, etc.). In certain embodiments, the enclosures can be environmentally sealed and can be re-enterable.

FIGS. 1-6 show an enclosure 20 in accordance with the principles of the present disclosure. The enclosure defines a central longitudinal axis 22 that extends along a length of the enclosure 20 from a bottom end 24 to a top end 26. A base 28 defines the bottom end 24 of the enclosure 20 while a dome 30 defines the top end 26 of the enclosure 20. The base 28 and the dome 30 are interconnected by a clamp 32 that mounts over flanges 31, 33 respectively defined by the base 28 and the dome 30 (see FIG. 6). A seal 24 (see FIG. 7) can mount between the flanges 31, 33 (see FIG. 6) to provide an environmental seal that prevents moisture, dust and, pests from entering the interior of the enclosure 20.

Figure 6:
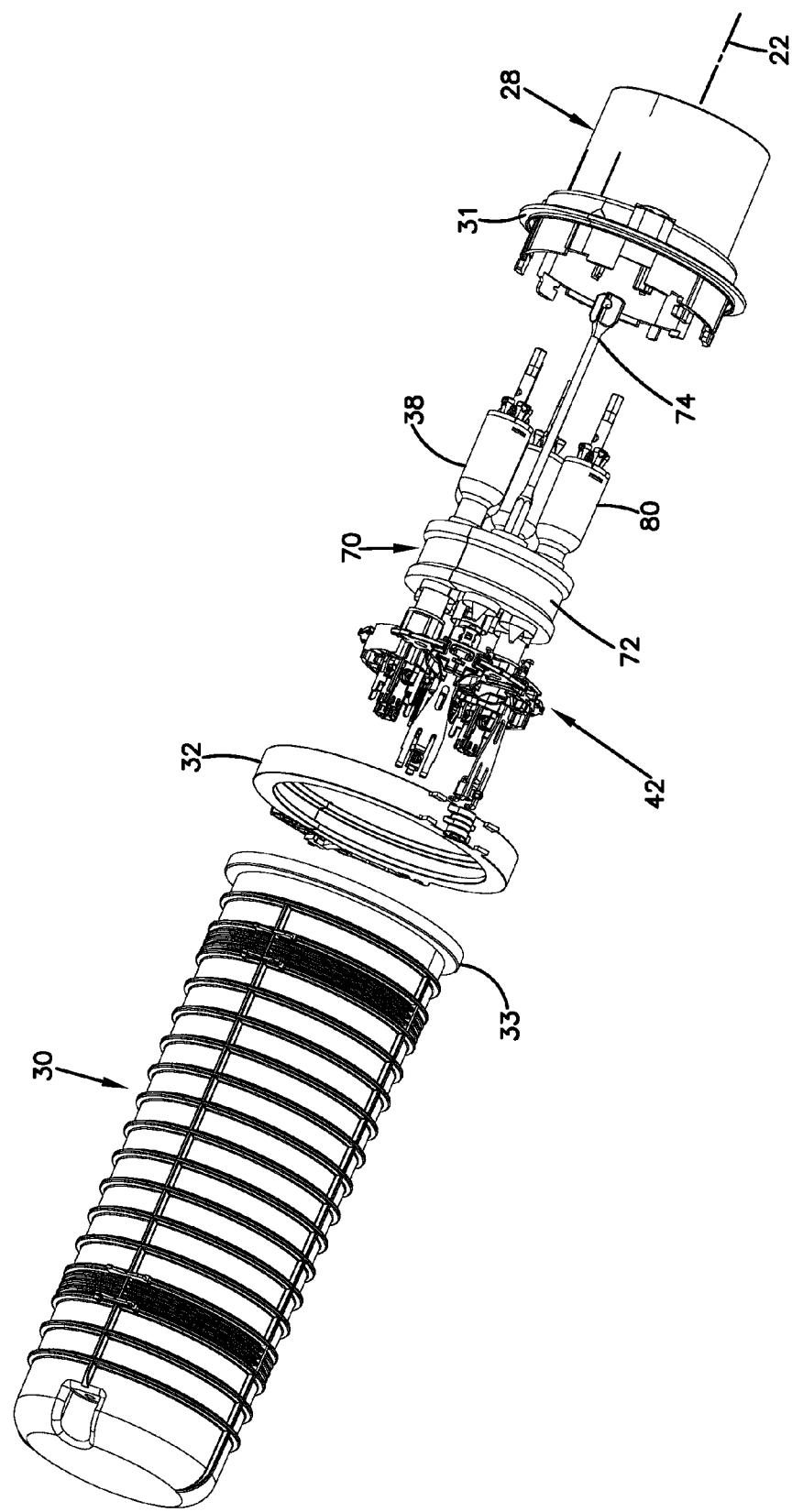
FIG. 6 is an exploded, perspective view of the enclosure of FIG. 1.
Figure 6A:
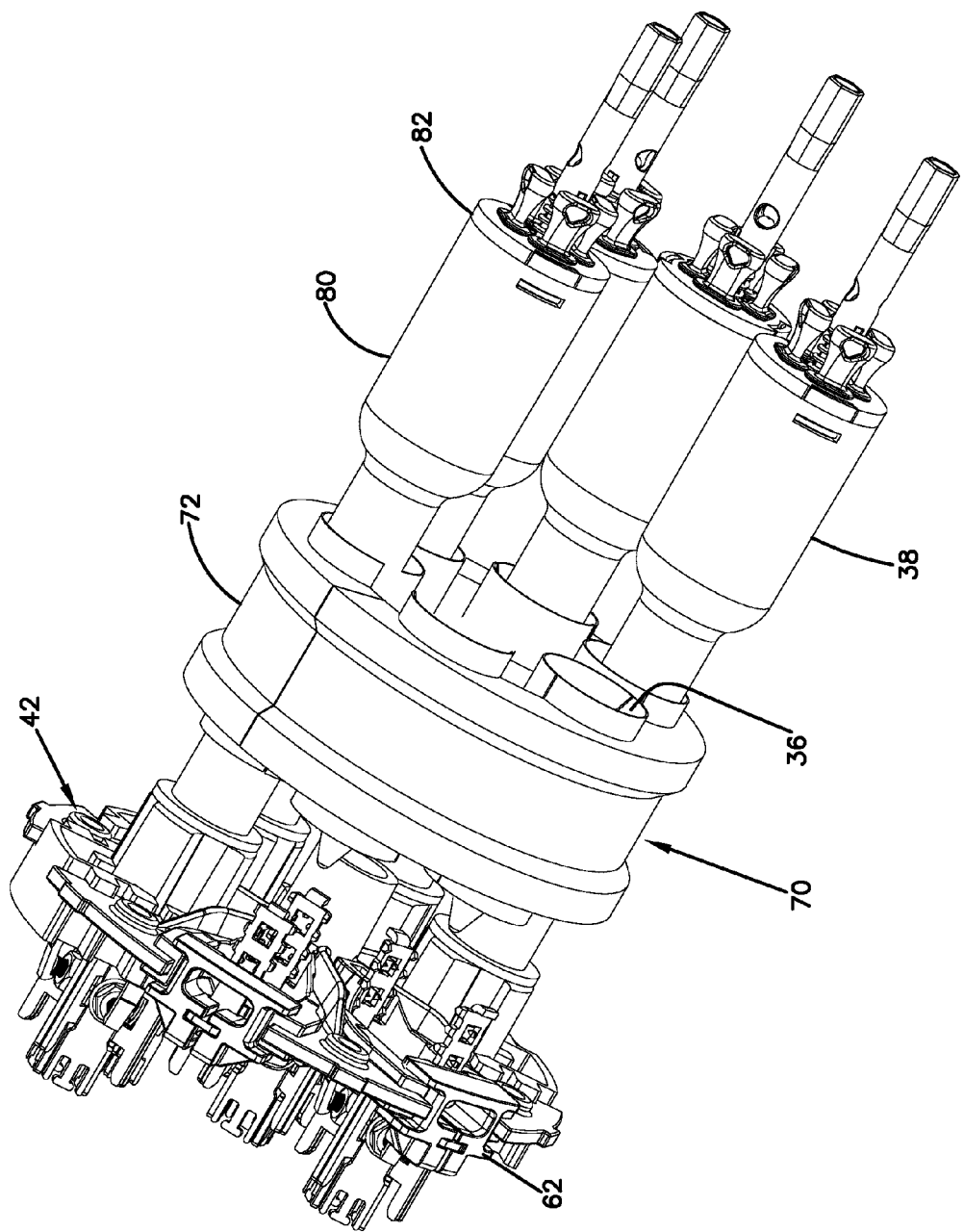
FIG. 6A is an enlarged view of a first portion of FIG. 6.

A plurality of primary cable through-ports 36 extend through the base 28 for allowing cables (e.g., trunk cables, drop cables, or other cables) to enter the enclosure 20 (see FIG. 6A). To accommodate drop cables or other smaller cables (i.e., secondary cables), secondary cable tube assemblies 38 are mounted in some of the primary cable through-ports 26 (see FIGS. 4 and 6A). The remainder of the primary cable through-ports 36 are shown receiving plugs 40 used to seal the unoccupied primary cable through-ports 36 (see FIG. 4). When it is desired to install a main cable through one of the primary cable through-ports 36, the plug 40 corresponding to the given primary cable through-port 36 is removed so that the main cable can be inserted through the primary cable through-port 36. Similarly, if it is desired to route one or more drop cables or other secondary cables through an additional one of the primary cable through-ports 36, the plug 40 corresponding to the primary cable through-port 36 can be removed and replaced with another one of the secondary cable tube assemblies 38.

Figure 7:
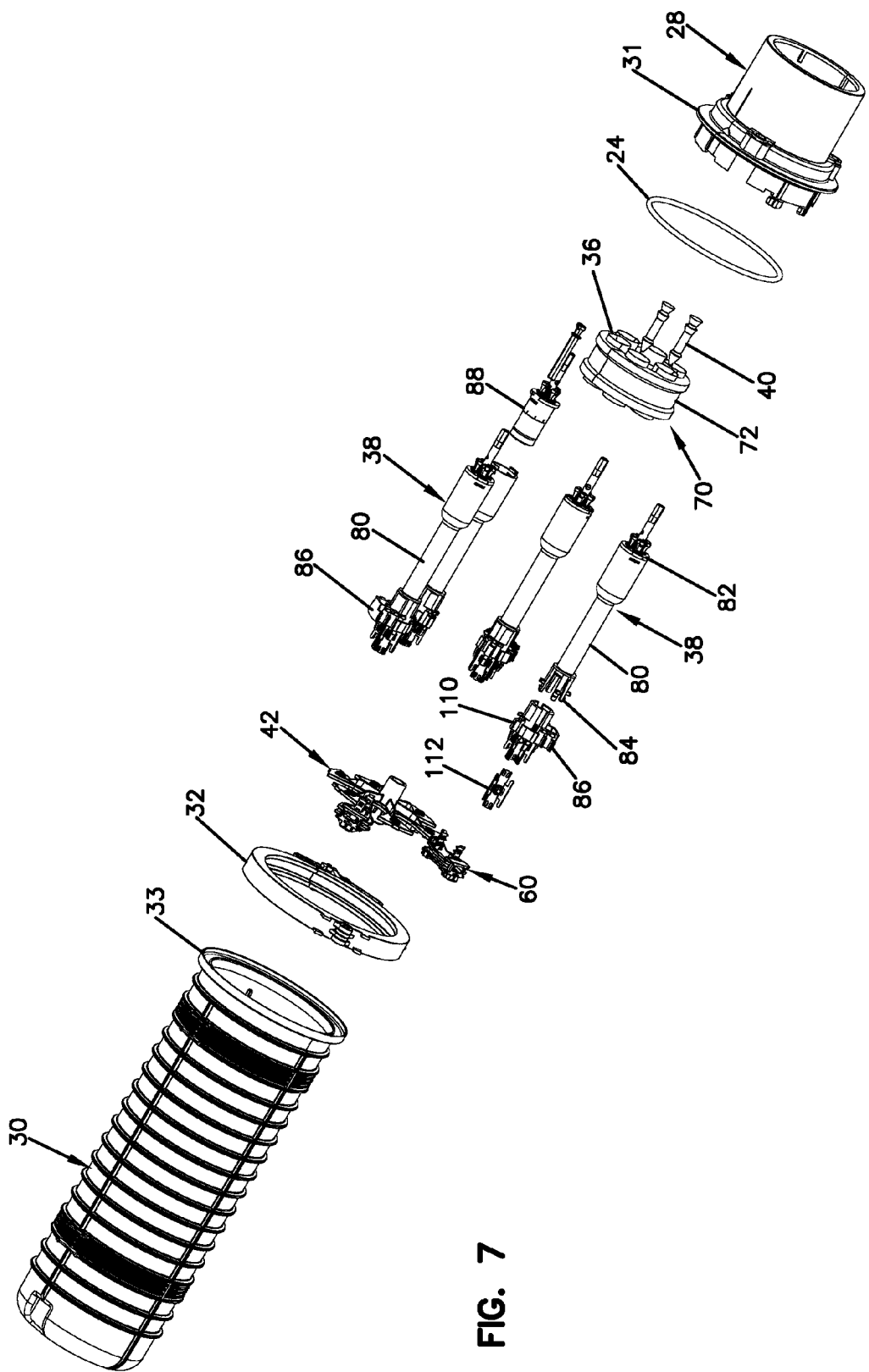
FIG. 7 is another exploded, perspective view of the enclosure of FIG. 1.
Figure 7A:
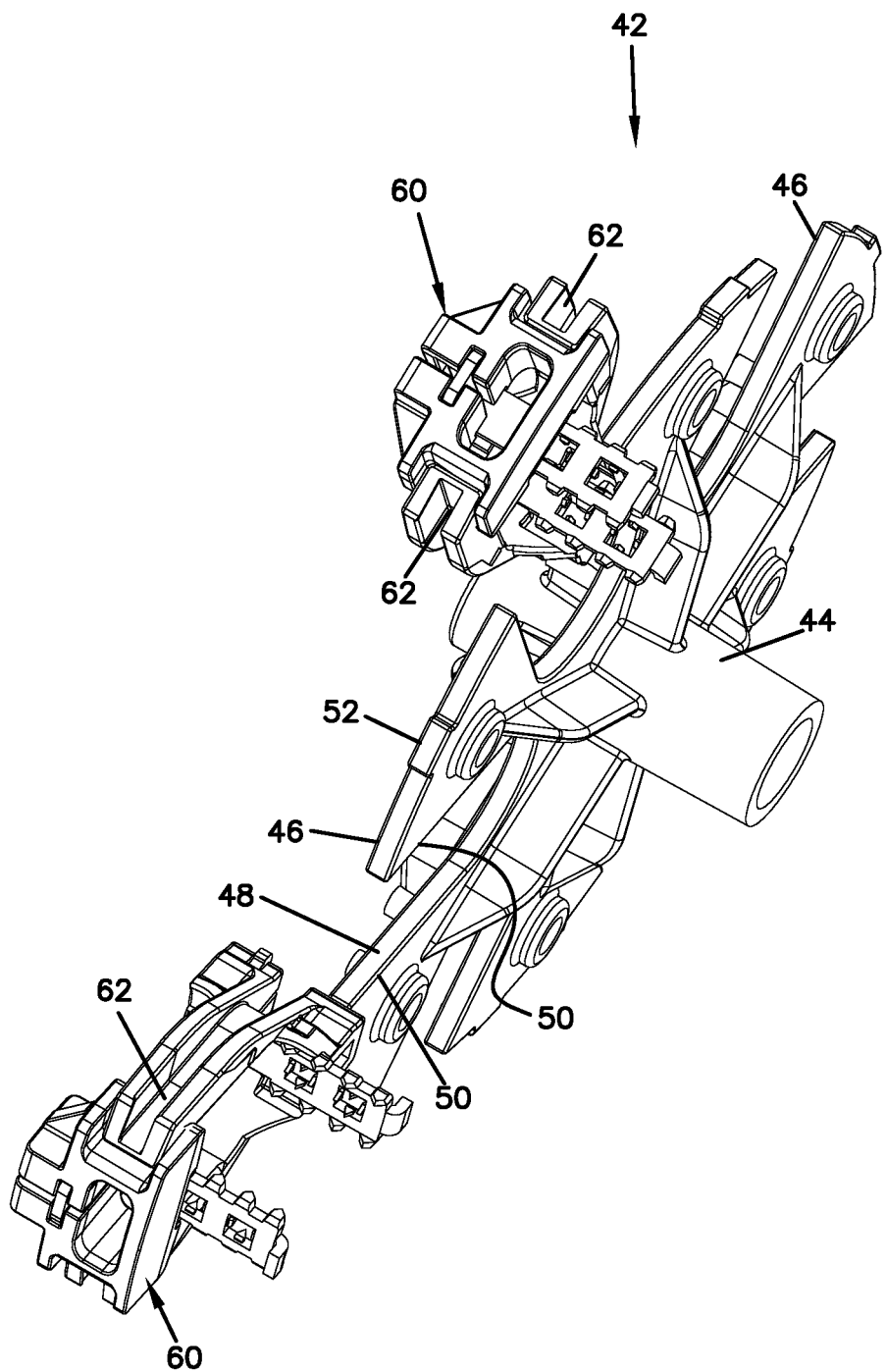
FIG. 7A is an enlarged view of a first portion of FIG. 7.

Referring to FIGS. 6 and 7, the enclosure 20 includes a main bracket 42 (e.g., a "star" bracket) that mounts to the base 28. The main bracket 42 includes a central region 44 and a plurality of arms 46 that project radially outwardly from the central region 44 (FIG. 7A). A plurality of U-shaped pockets 48 are defined between the arms 46. The U-shaped pockets 48 are defined in part between opposing parallel edges 50 of the arms 46. The pockets 48 align with the primary cable through-ports 36 (see FIG. 6A). Anti-rotation tabs 52 are provided at outer ends of the arms 46 (see FIG. 7A). When the main bracket 42 is mounted within the base 28, the anti-rotation tabs 52 fit within corresponding grooves defined by the base 28 to limit relative rotation between the base 28 and the main bracket 42 about the central longitudinal axis 22. A clamp or other locking mechanism can be used to secure the main bracket 42 within the base 28 and to limit axial movement between the main bracket 42 and the base 28. In certain embodiments, the main bracket 42 can function as a foundation for supporting additional framework that extends into the dome 30. It will be appreciated that optical components, such as optical splitters, splice trays, wavelength division multipliers, fiber storage trays or other components, can be supported on the framework within the dome 30.

Referring still to FIGS. 6 and 7, primary cable anchoring assemblies 60 can be supported on the main bracket 42 (FIG. 7A). For example, the primary cable anchoring assembly 60 can be mounted in the U-shaped slots 48 of the main bracket 42 with the edges 50 of the arms 46 received within corresponding slots 62 defined by the primary cable anchoring assemblies 60. It will be appreciated that each primary cable anchoring assembly 60 can be used to anchor a corresponding primary cable (i.e., a main or trunk cable) routed through a corresponding one of the primary cable through-ports 36. Typically, the primary cable anchoring assemblies 60 can clamp or otherwise mechanically engage jackets of the primary cables routed through the primary cable through-ports 36 to prevent relative movement between the primary cables and the main bracket 42. The relative movement is limited in either direction extending along the central longitudinal axis 22. In this way, the primary cables can be effectively anchored to the base 28 of the enclosure 20. If it is desired to route one or more secondary cables through a given one of the primary cable through-ports 36, the corresponding primary cable anchoring assembly 60 can be removed from the main bracket 42, thereby providing clearance for mounting a corresponding secondary cable tube assembly 38 adapted to seal and anchor secondary cables such as drop cables that are routed into the enclosure 20.

The enclosure 20 also includes a primary sealant assembly 70 that mounts within the base 28 (see FIG. 6A). The primary sealant assembly 70 includes a primary volume of sealant 72 (e.g., a sealing material such as gel) that defines the plurality of primary cable through-ports 36. The primary cable through-ports 36 pass through the primary sealant assembly 70 to provide sealed cable access to the interior of the enclosure 20. The primary sealant assembly 70 further includes a primary actuator 74 (FIG. 6) for pressurizing the primary volume of sealant 72. In certain embodiments, the primary actuator 74 uses a threaded mechanical mechanism to pressurize the primary volume of sealant 72 in an axial direction.

It will be appreciated that the primary sealant assembly 70 has a wrap-around configuration that can be laterally opened when the primary sealant assembly 70 has been removed from the base 28 so as to allow structures (e.g., plugs 40, secondary cable tube assemblies 38, or primary cables) to be inserted into the primary cable through-ports 36 in radial/lateral directions relative to the central longitudinal axis 22. In this way, it is not necessary to insert such structures in an axial direction through the primary cable through-ports 36.

Figure 7B:
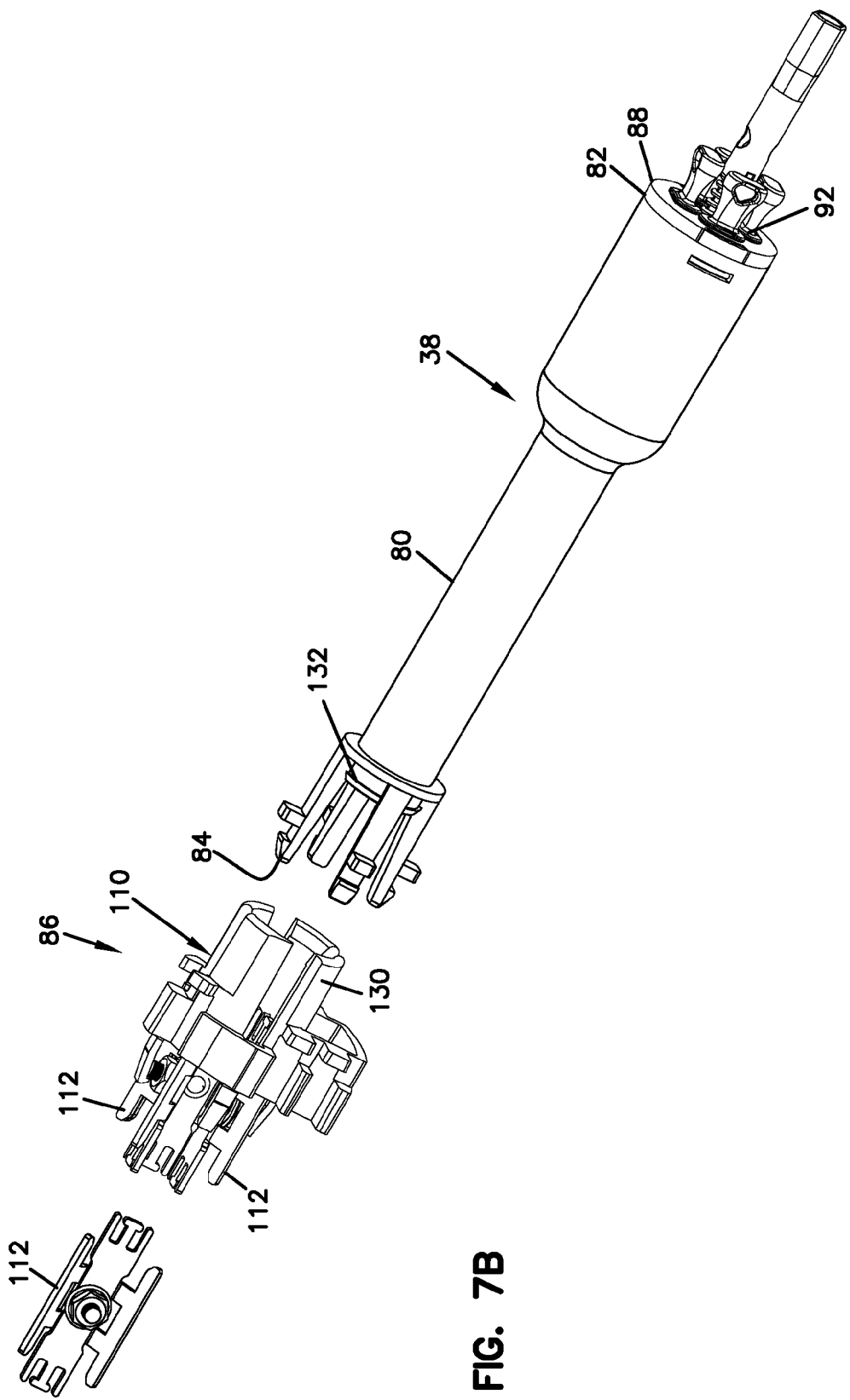
FIG. 7B is an enlarged view of a second portion of FIG. 7.
Figure 8:
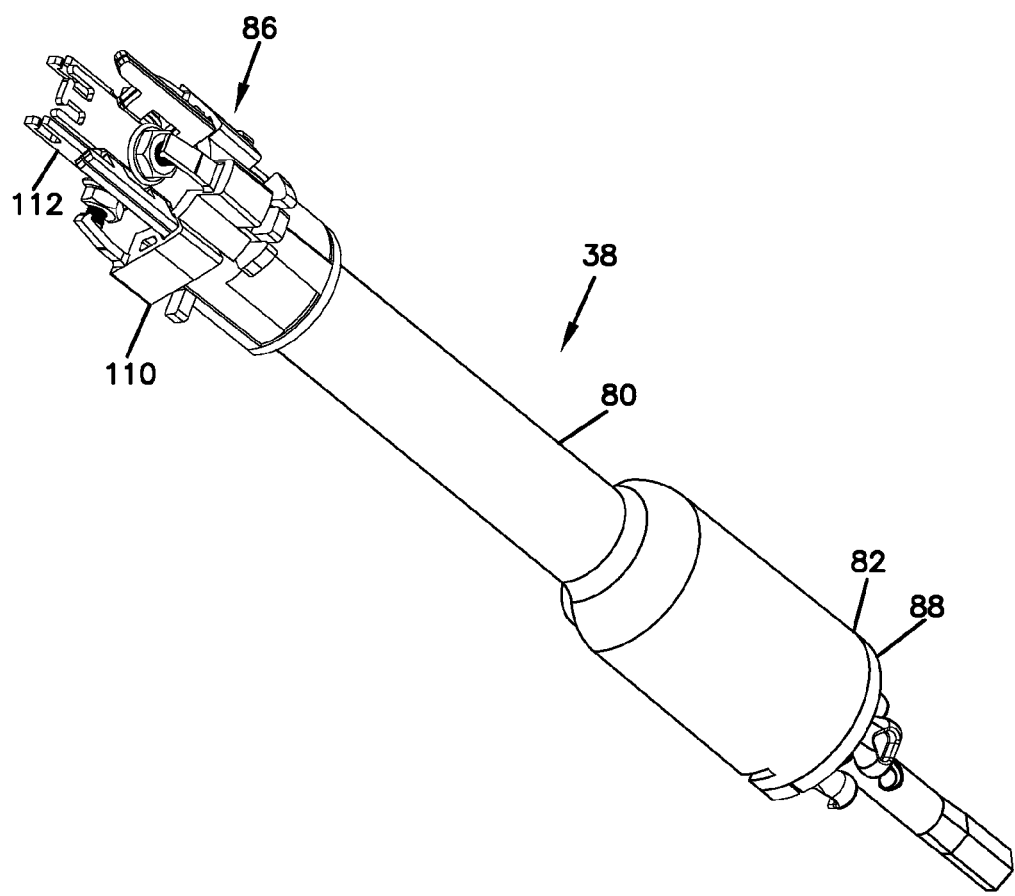
FIG. 8 is a perspective view of a secondary cable tube assembly of the enclosure of FIG. 1.

Axial pressurization of the primary volume of sealant 72 forces the primary volume of sealant 72 to deform radially outwardly to provide a circumferential seal against an interior surface of the base 28. Concurrently, pressurization of the primary volume of sealant 72 causes the primary cable through-ports 36 to constrict in diameter. In this way, the primary volume of sealant 72 presses against and conforms to the outer shape of whatever structure is mounted through the primary cable through-ports 36 (e.g., a primary cable, a plug, or a secondary cable tube assembly 38). In this way, the primary volume of sealant 72 forms circumferential seals around the structures received within the primary cable through-ports 36. Referring to FIGS. 6, 7 and 8-12, each of the secondary cable tube assemblies 38 includes a secondary cable tube 80 having a first end 82 and an opposite second end 84. The secondary cable tube assembly 38 also includes a secondary cable anchoring assembly 86 and a secondary cable sealant assembly 88. The secondary cable sealant assembly 88 mounts within the first end 82 of the secondary cable tube 80 and the secondary cable anchoring assembly 86 mounts at the second end 84 of the secondary cable tube 80 (see FIG. 7B). When the secondary cable tube 80 is secured within one of the primary cable through-ports 36, the first end 82 of the secondary cable tube 80 is located outside the enclosure 20 and the second end 84 of the secondary cable tube 80 is located inside the enclosure 20 (see FIGS. 6 and 7). The primary volume of sealant 72 presses against and conforms to the outer shape of the secondary cable tube 80 to form the circumferential seal.

Figure 9:
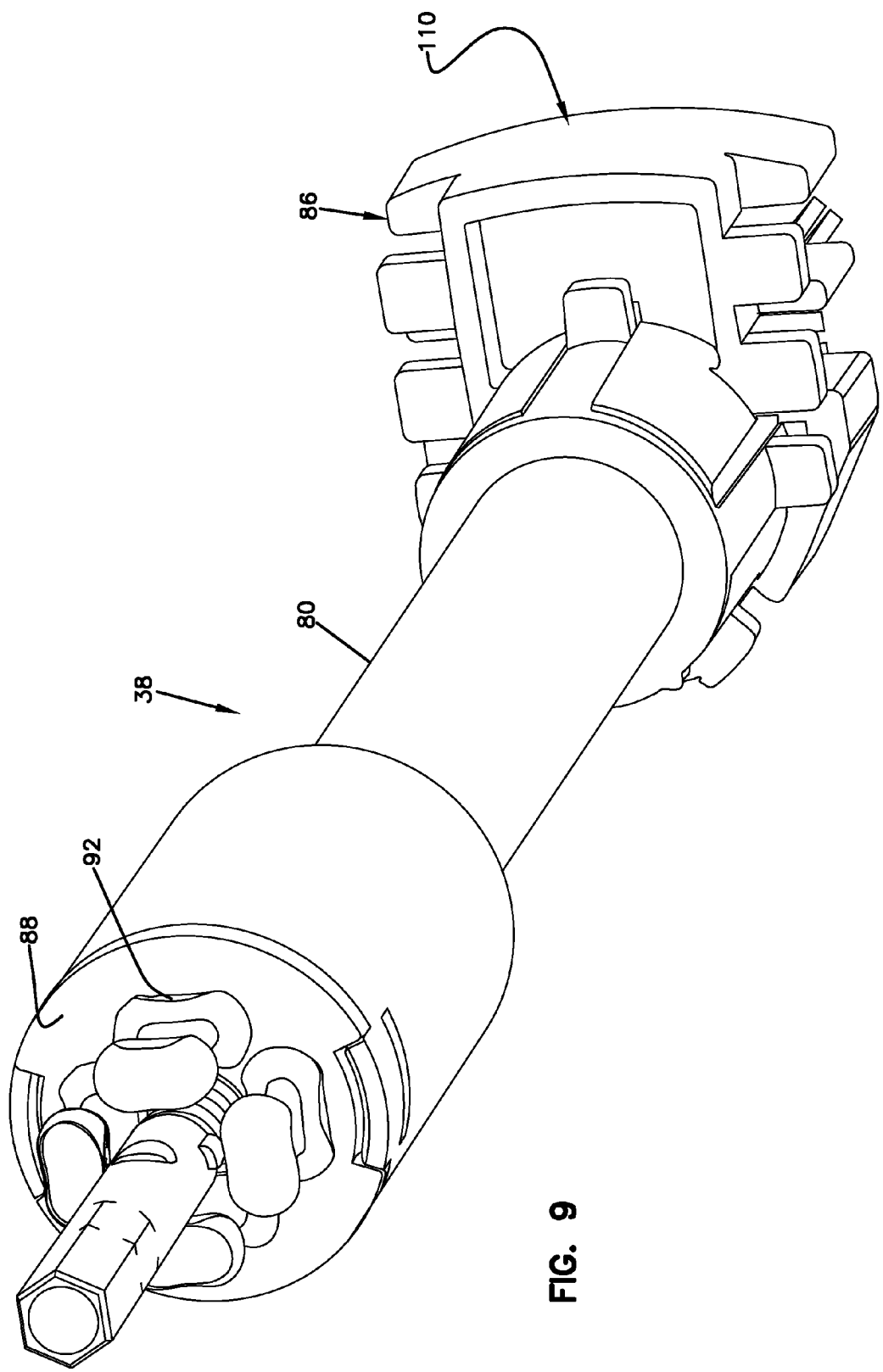
FIG. 9 is another perspective view of the secondary cable tube assembly of FIG. 8.
Figure 11:
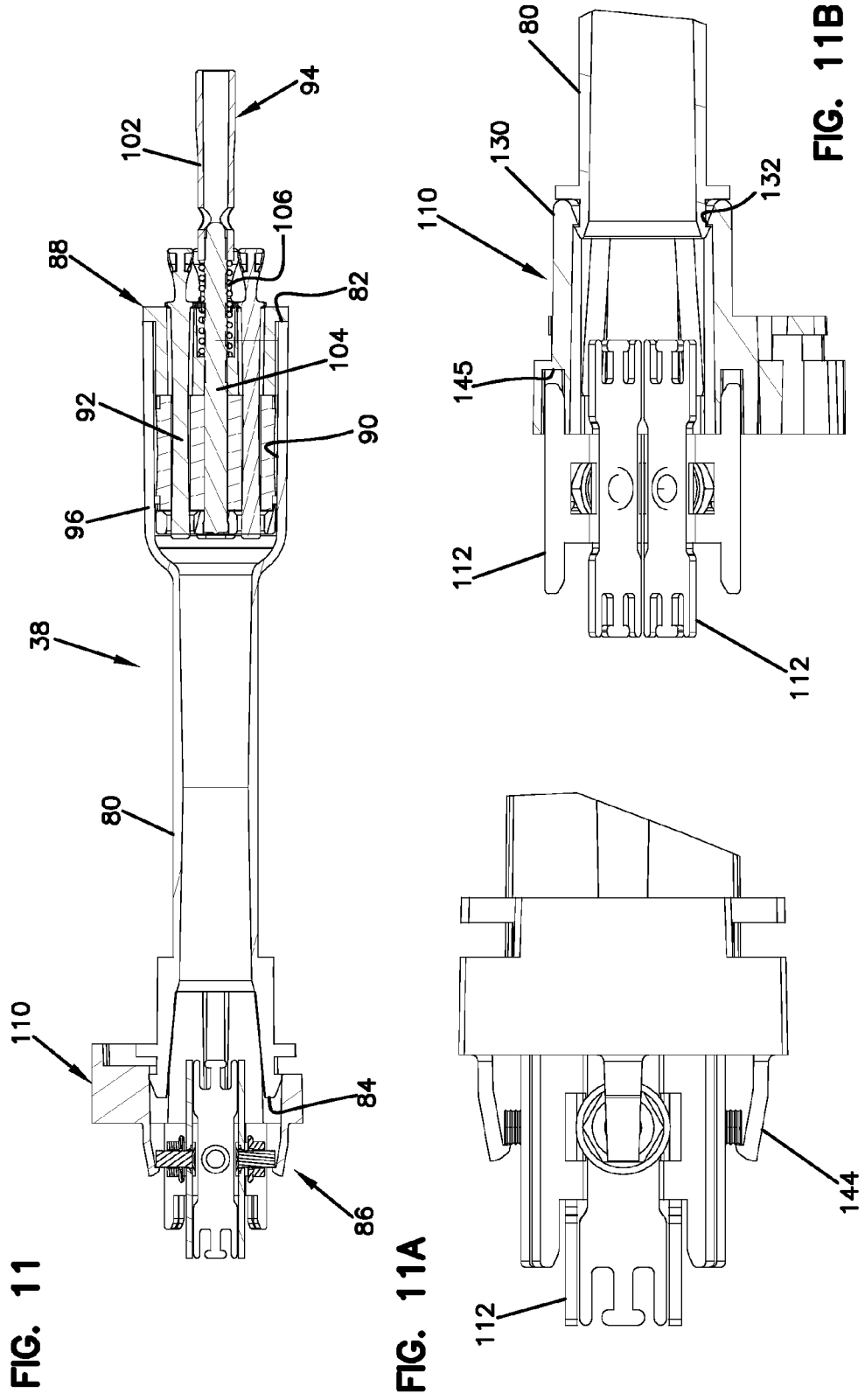
FIG. 11 is a longitudinal cross-sectional view of the secondary cable tube assembly of FIG. 8.
Figure 13:
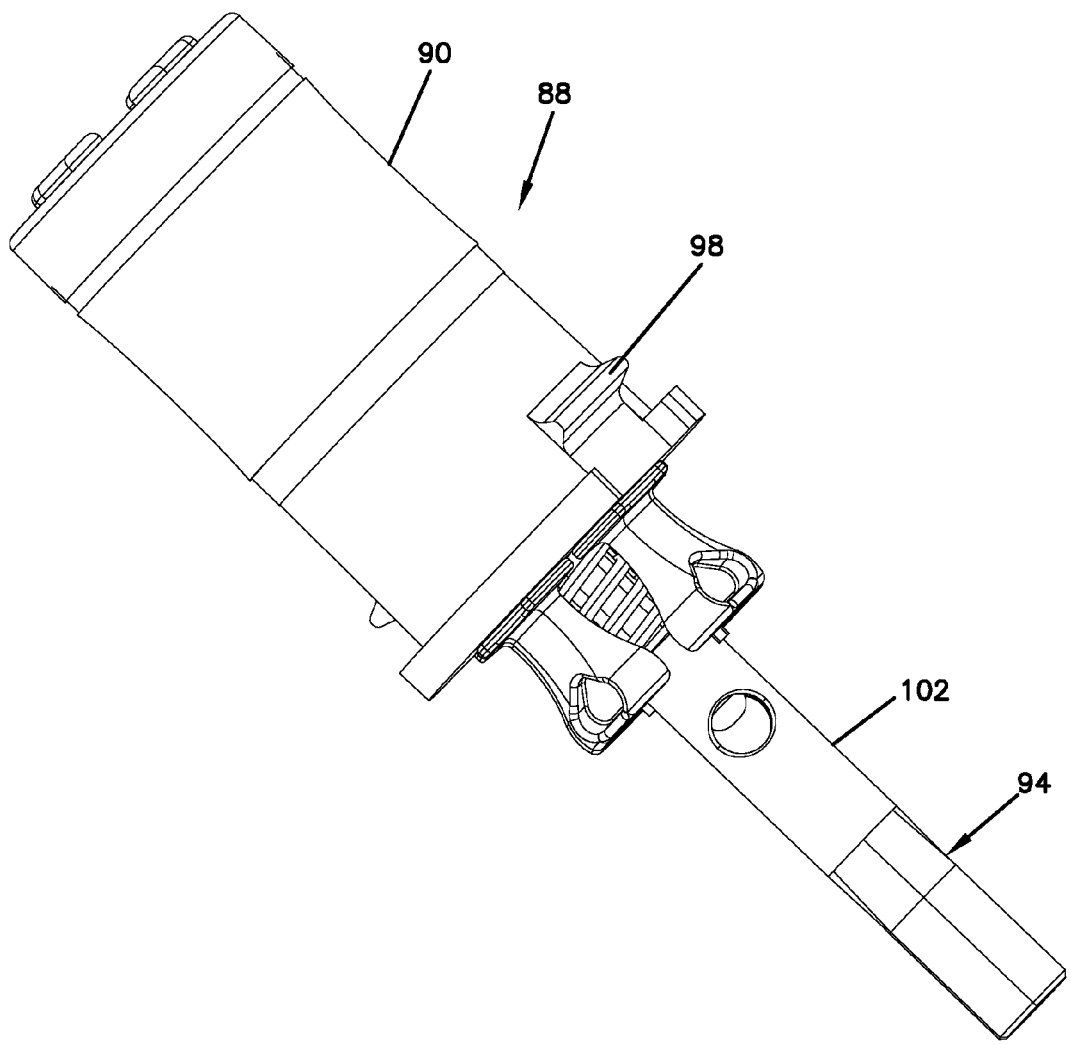
FIG. 13 is a secondary cable sealant assembly that is used in the secondary cable tube assembly of FIG. 8.
Figure 14:
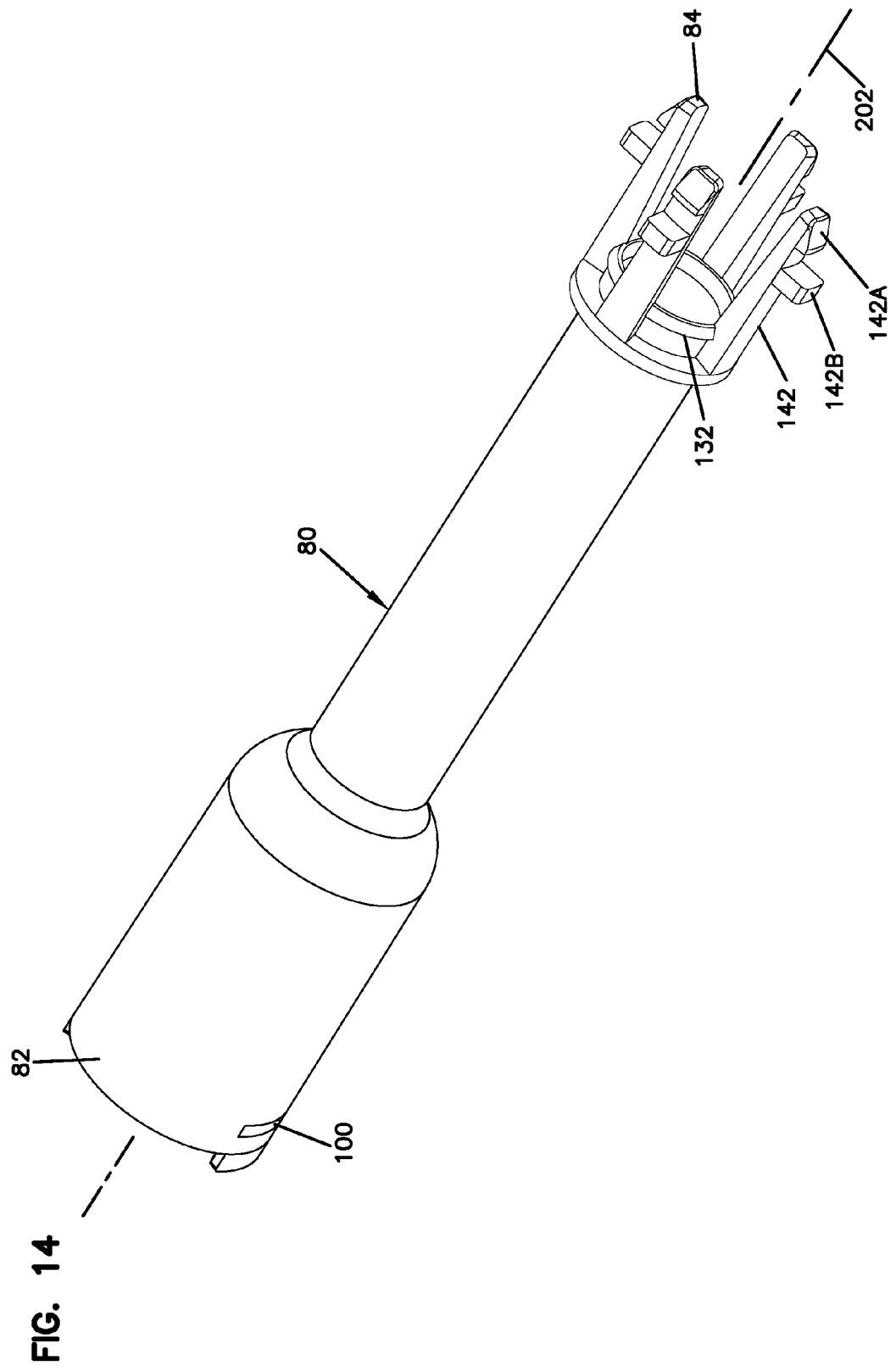
FIG. 14 is a perspective view of a secondary cable tube that is part of the secondary cable tube assembly of FIG. 8.
Figure 15:
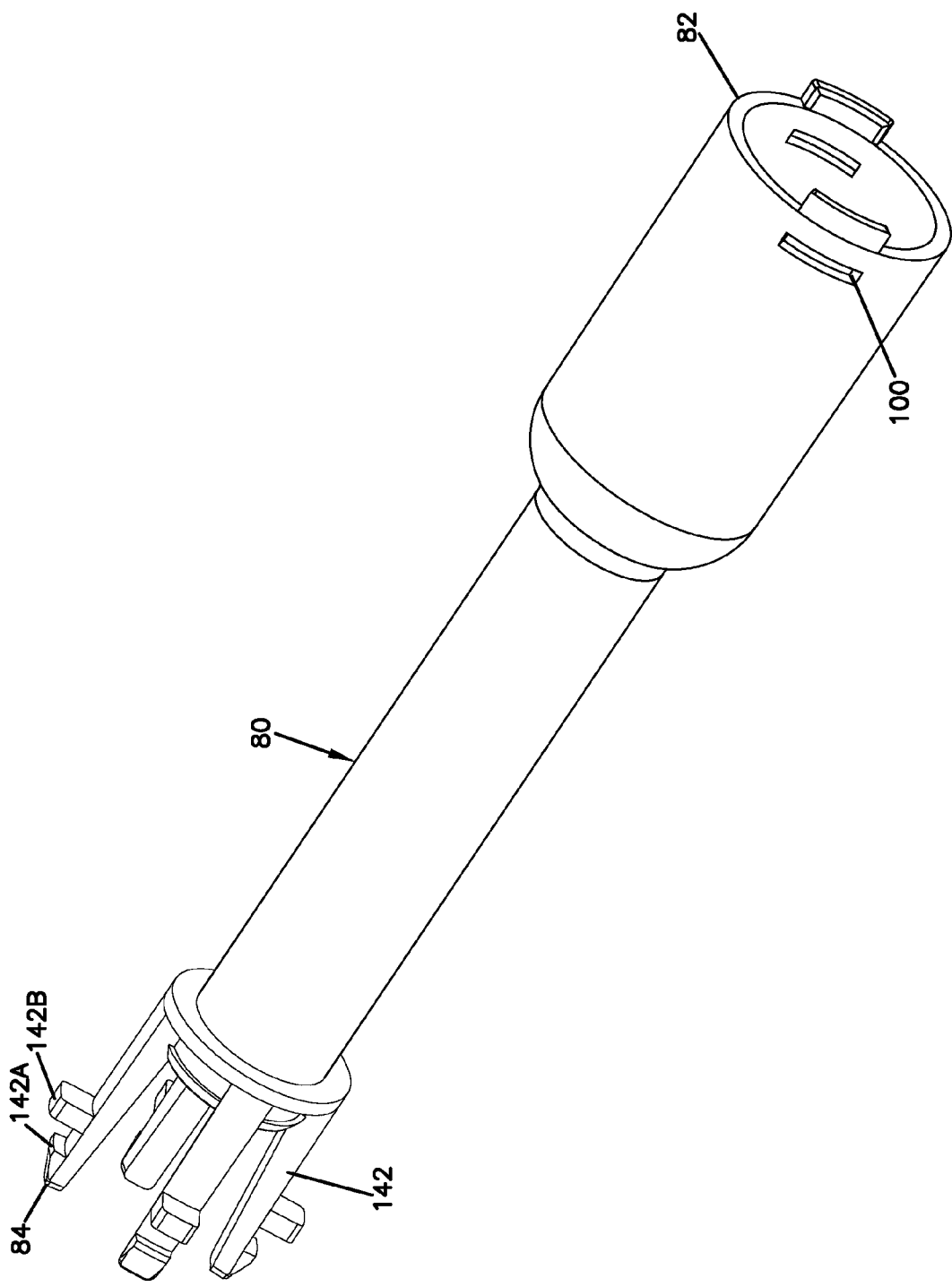
FIG. 15 is another perspective view of the secondary cable tube of FIG. 14.
Figure 19:
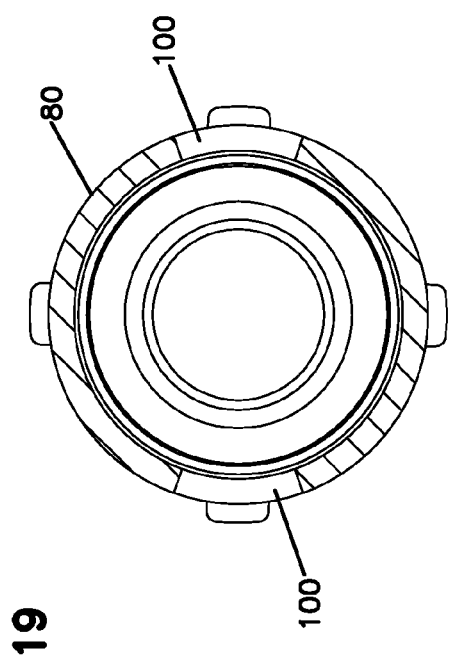
FIG. 19 is a cross-sectional view taken along section line 19-19 of FIG. 16.
Figure 20:
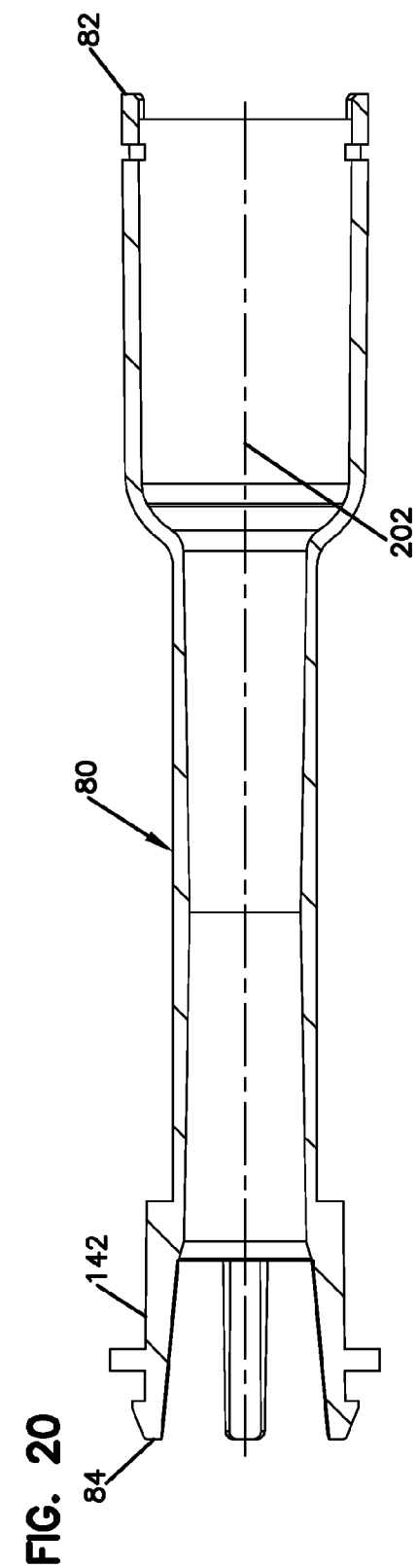
FIG. 20 is a cross-sectional view taken along section line 20-20 of FIG. 16.

Referring to FIGS. 9, 11, and 13, the secondary cable sealant assembly 88 includes a secondary sealant volume 90 defining a plurality of secondary cable through-ports 92 (e.g., drop cable ports) that extend through the secondary cable sealant assembly 88. The secondary cable sealant assembly 88 also includes a secondary actuator 94 for pressurizing the secondary sealant volume 90. Referring to FIG. 11, the secondary cable tube 80 has an enlarged diameter portion 96 positioned at the first end 82. The enlarged diameter portion 96 is configured for receiving the secondary cable sealant assembly 88. When the secondary cable sealant assembly 88 is inserted into the enlarged diameter portion 96, tabs 98 (FIG. 13) of the secondary cable sealant assembly 88 snap within corresponding openings 100 (FIG. 15) of the secondary cable tube 80 so as to assist in axially retaining the secondary cable sealant assembly 88 within the secondary cable tube 80 and to resist rotation between the secondary cable tube 80 and the secondary cable sealant assembly 88.

Once the secondary cable sealant assembly 88 has been inserted within the secondary cable tube 80, the secondary actuator 94 can be used to pressurize the secondary sealant volume 90. When the secondary sealant volume 90 is pressurized, the secondary sealant volume 90 is forced to deform radially outwardly so as to form a circumferential seal against the interior surface of the secondary cable tube 80. Concurrently, the secondary sealant volume 90 deforms radially inwardly so as to constrict the sizes of the secondary cable through-ports 92. In this way, the secondary sealant volume 90 is adapted to form seals around any structures (e.g., plugs, secondary cables, etc.) inserted through the secondary cable through-ports 92. In the depicted embodiment, the secondary actuator 94 is actuated by a threading handle 102 on a shaft 104 (FIGS. 11 and 13). As the handle is threaded onto the shaft 104, a spring 106 is compressed thereby applying a compressive load to the secondary sealant volume 90 which axially pressurizes the secondary sealant volume 90 (see FIG. 11). It will be appreciated that the primary actuator 74 can operate in a similar manner.

Referring to FIGS. 8-12, the secondary cable anchoring assembly 86 includes a secondary cable anchoring housing 110 and a plurality of secondary cable anchoring brackets 112 that mount to the secondary cable anchoring housing 110. Referring to FIGS. 21-26, the secondary cable anchoring housing 110 includes an inner cavity 114 that aligns with the secondary cable tube 80 and is adapted for receiving the secondary cable anchoring brackets 112 (also see FIG. 7B). As shown at FIG. 23, the secondary cable anchoring housing 110 is elongated along an axis 116 that extends from a first end 118 to a second end 120 of the secondary cable anchoring housing 110. Opposite sides 121, 123 extend from the first end 118 to the second end 120. The sides 121, 123 are generally parallel. A convex surface 122 is provided at the first end 118.

Figure 21:
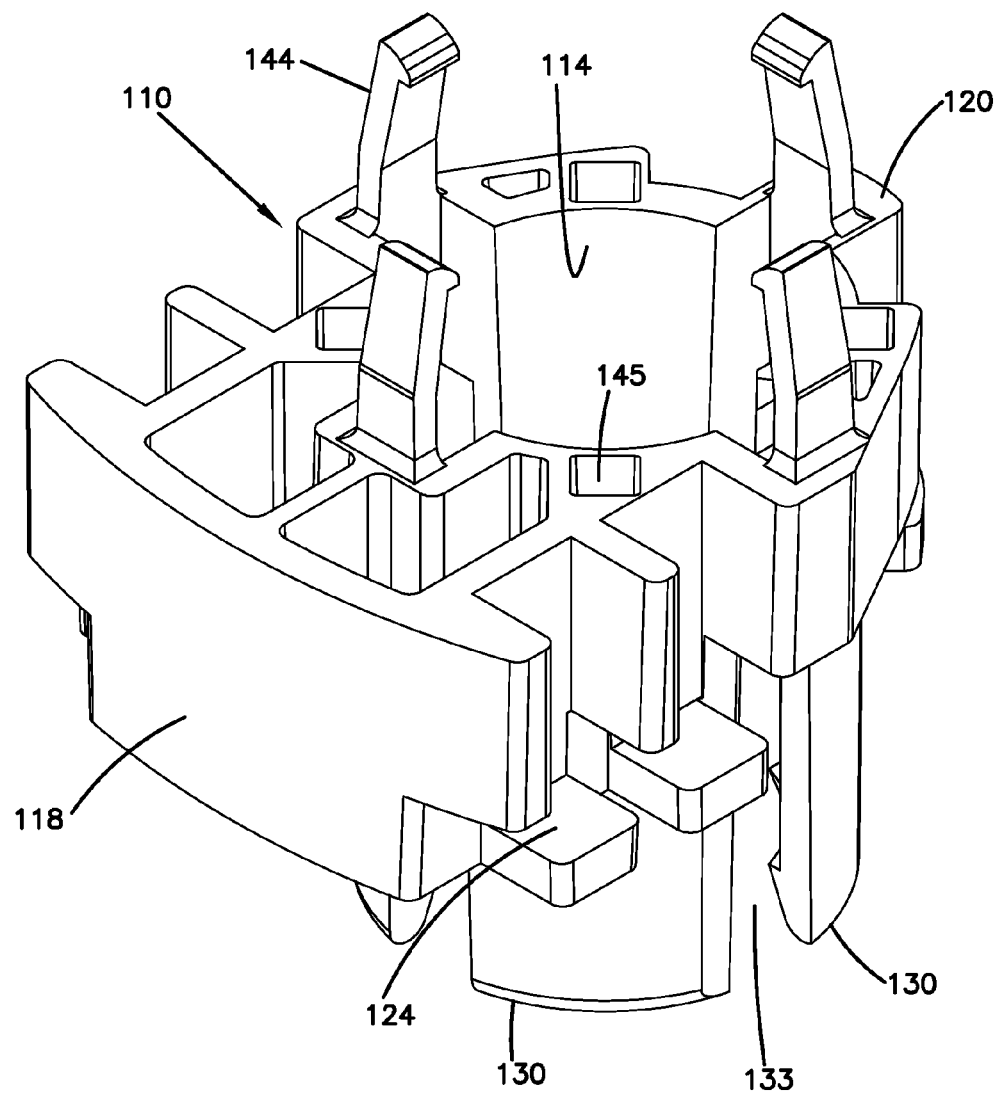
FIG. 21 is a perspective view of a cable anchoring housing that is part of the secondary cable tube assembly of FIG. 8.
Figure 22:
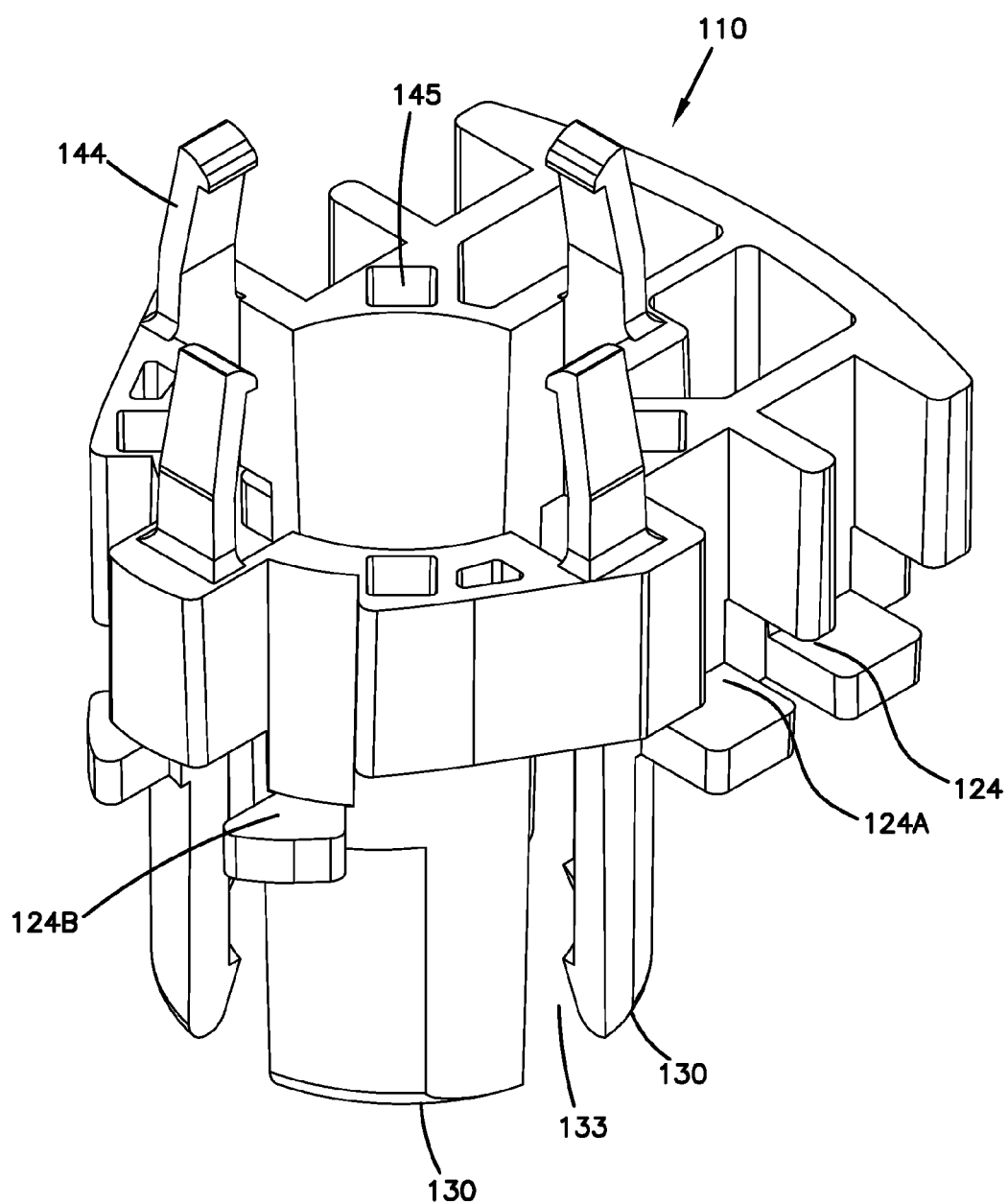
FIG. 22 is another perspective view of the cable anchoring housing of FIG. 21.
Figure 23:
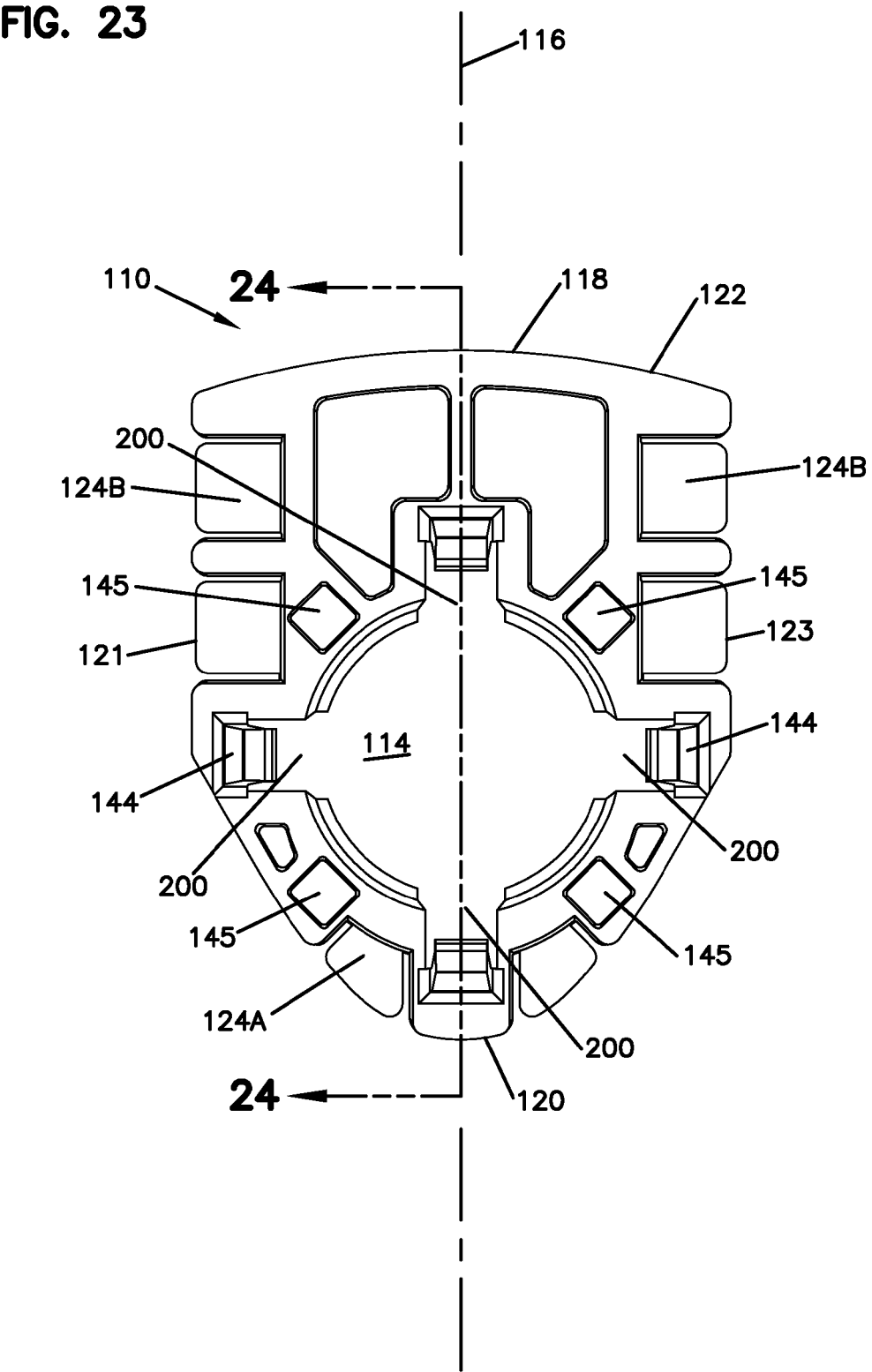
FIG. 23 is a top view of the cable anchoring housing of FIG. 21.
Figure 24:
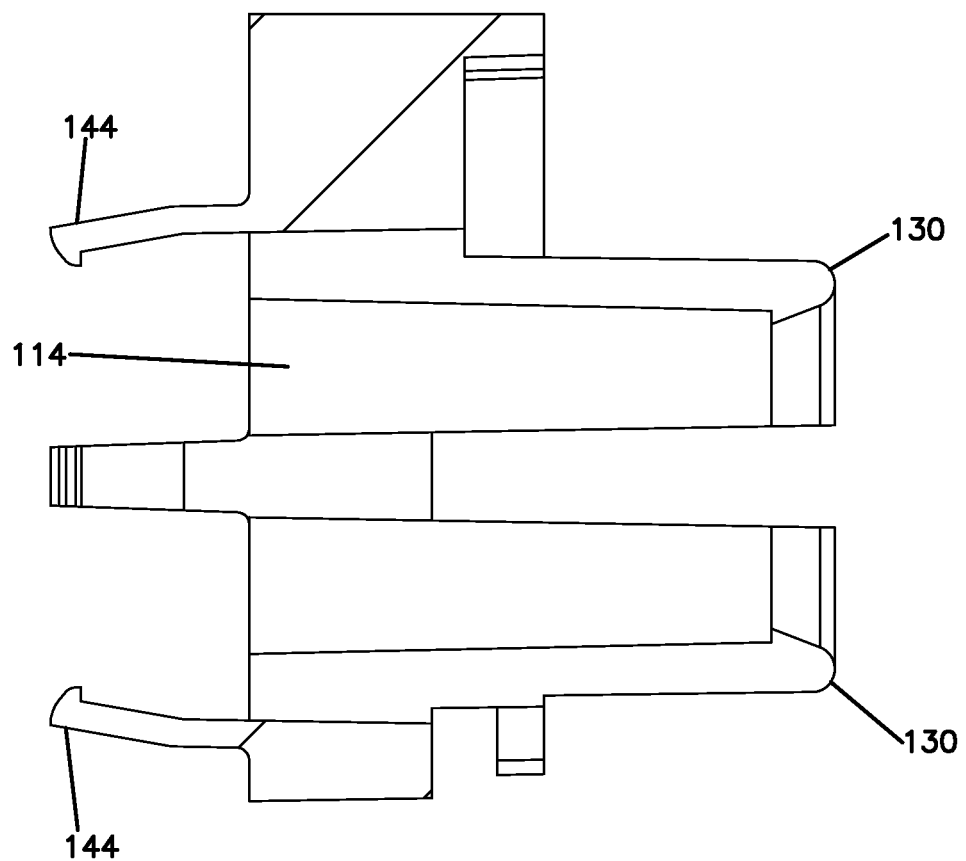
FIG. 24 is a cross-sectional view taken along section line 24-24 of FIG. 23.
Figure 25:
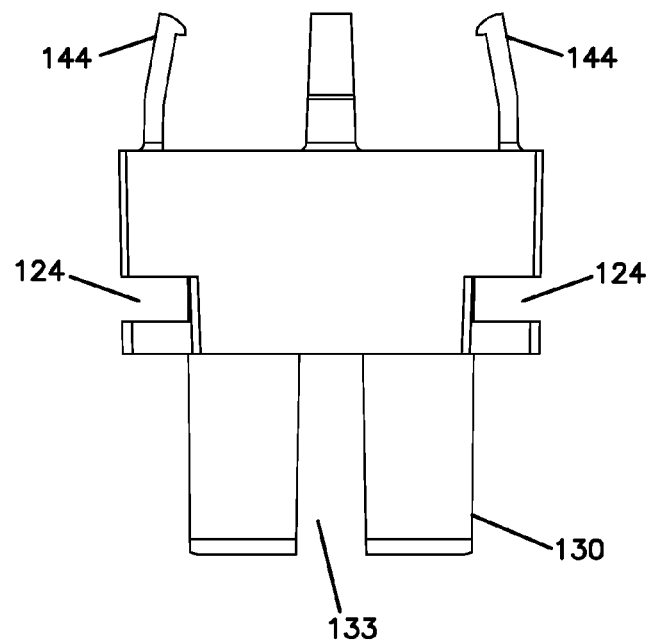
FIG. 25 is a side, elevation view of the cable anchoring housing of FIG. 21.
Figure 26:
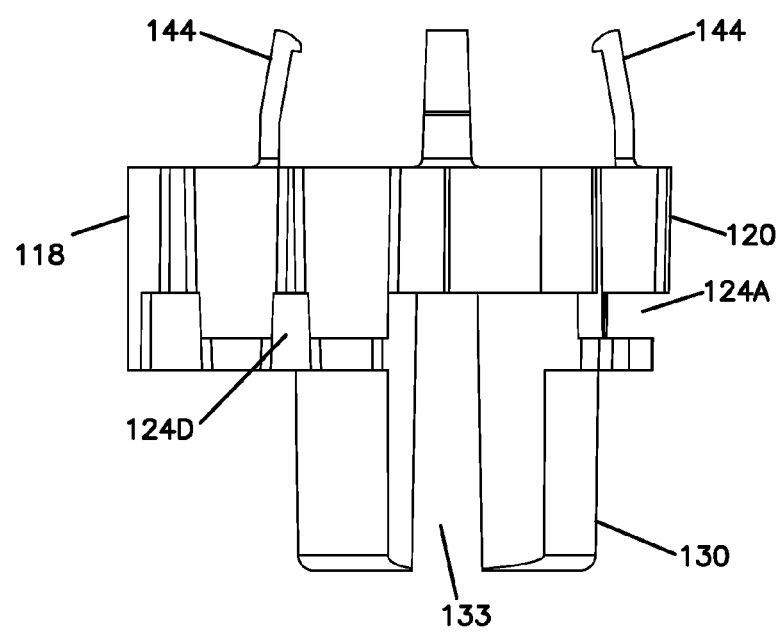
FIG. 26 is another side, elevation view of the cable anchoring housing of FIG. 21.

The secondary cable anchoring housing 110 defines a groove structure 124 that extends partially around a perimeter of the secondary cable anchoring housing 110 (see FIGS. 21-22). The groove structure 124 is configured to receive the edges 50 of the arms 46 of the main bracket 42 such that the secondary cable anchoring housing 110 can be mounted within one of the U-shaped pockets 48 of the main bracket 42 (see FIG. 6A). The groove structure 124 includes a curved portion 124A that extends around the second end 120 of the secondary cable anchoring housing 110 and straight portions 124B that extend along the opposite sides 121, 123 of the secondary cable anchoring housing 110 (see FIG. 23). The groove-structure 124 extends along a U-shaped path that matches the shape of the U-shaped pockets 48 of the main bracket 42.

The secondary cable anchoring housing 110 is mounted in one of the U-shaped-pockets pockets 48 by inserting the second end 120 into the pocket and then fitting the opposing edges 50 into the groove structure 124. When the secondary cable anchoring housing 110 is mounted within one of the U-shaped pockets 48, the opposing edges 50 of the main bracket 42 fit within the straight portions 124B of the groove structure 120 and prevent rotation between the secondary cable anchoring housing 110 and the main bracket 42. The interface between the groove structure 124 and the edges 50 also prevents relative axial movement between the secondary cable anchoring housing 110 and the main bracket 42. Thus, the secondary cable anchoring housing 110 is effectively fixed or secured relative to the main bracket 42. When the secondary cable anchoring housing 110 is inserted within one of the U-shaped slots 48 of the main bracket 42, the second end 120 of the secondary cable anchoring housing 110 faces toward the central longitudinal axis 22 of the enclosure 20 (FIG. 6) and the convex outer surface 122 faces away from the central longitudinal axis 22 (see FIG. 6A).

Figure 10:
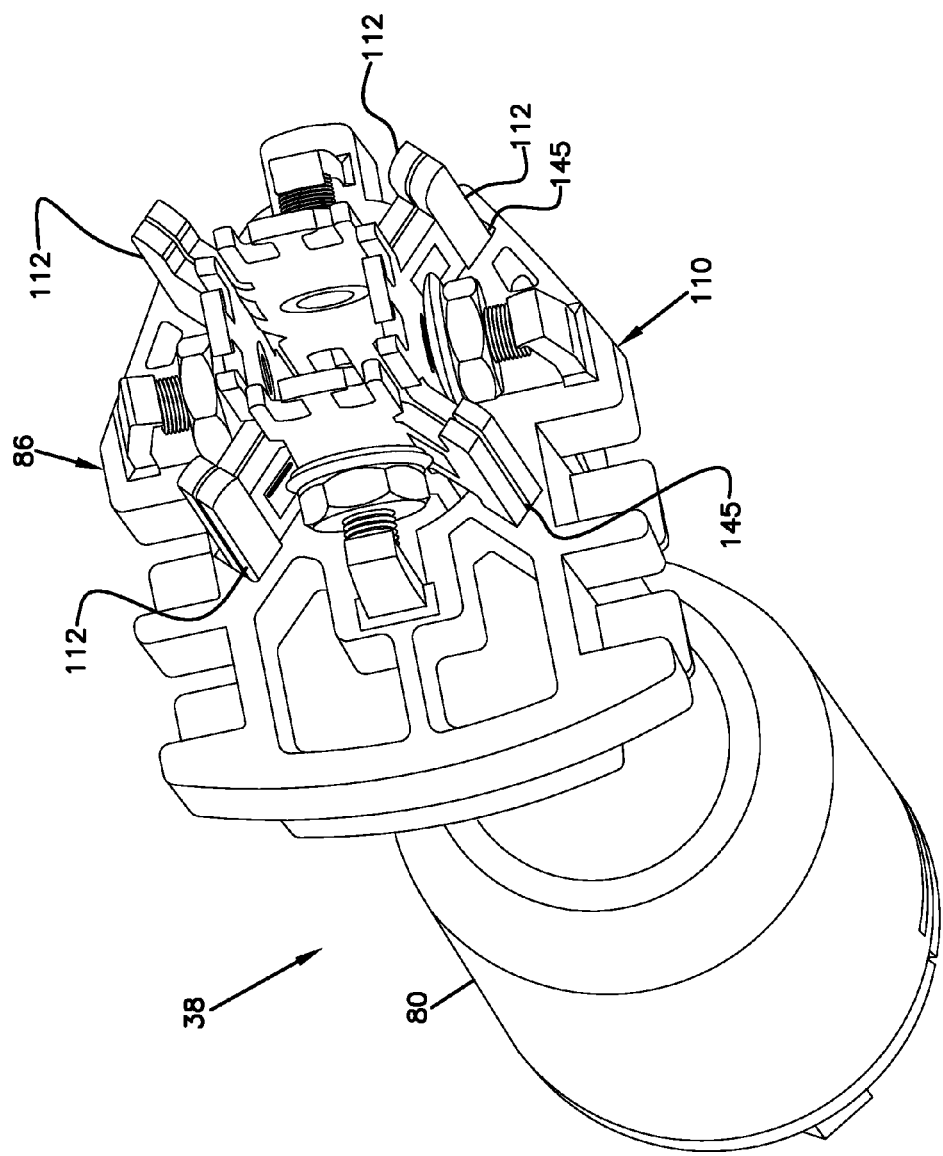
FIG. 10 is a further perspective view of the secondary cable tube assembly of FIG. 8.
Figure 12:
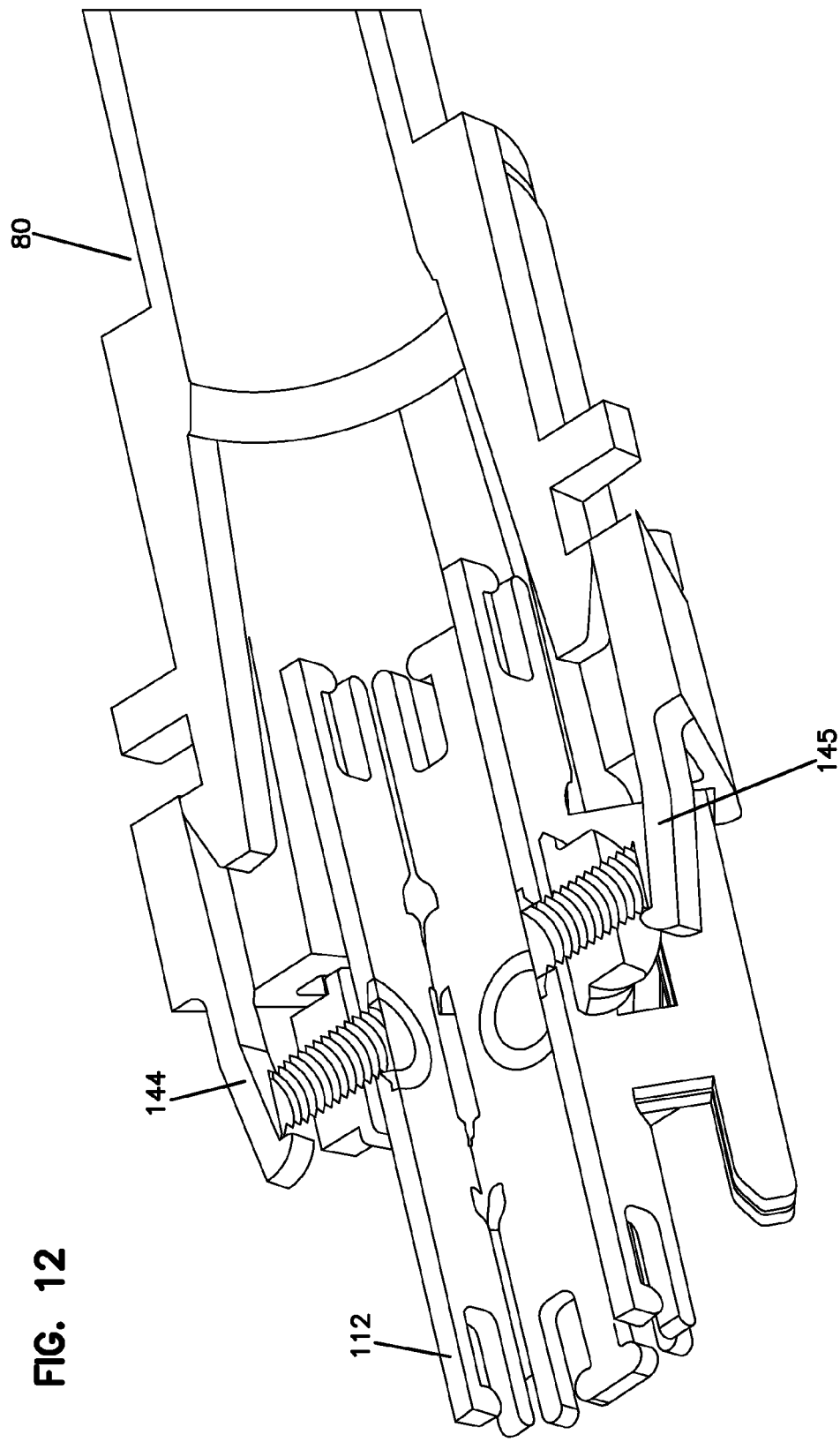
FIG. 12 is a perspective of an end portion of the secondary cable tube assembly of FIG. 8.

Referring still to FIGS. 10-12, the secondary cable anchoring housing 110 is adapted to mount to the second end 84 of the secondary cable tube 80 via a connection, such as a snap fit connection. For example, the secondary cable anchoring housing 110 includes a plurality of lower latches 130 (FIG. 24) that snap over retention shoulders 132 (FIG. 7B) defined by the secondary cable tube 80 so as to retain the secondary cable anchoring housing 110 on the secondary cable tube 80 (see FIG. 11B). As shown as FIGS. 21 and 22, the lower latches 130 are separated by axial slots 133. The second end 84 of the secondary cable tube 80 includes a plurality of axial prongs 142 (FIGS. 14-20) adapted to fit within the axial slots 133 when the secondary cable anchoring housing 110 is mounted at the second end 84 of the secondary cable tube 80 (see FIG. 7B). The interaction between the prongs 142 and groove structures 124 inhibits rotation of the anchoring housing 110 relative to the tube 80. The prongs 142 include lateral projections 142A and lateral projections 142B that assist align with and complement the groove structure 124 of the secondary cable anchoring housing 110 when the secondary cable anchoring housing 110 is mounted on the secondary cable tube 80 (see FIG. 8).

The secondary cable anchoring housing 110 defines four anchoring bracket mounting locations 200 (see FIG. 23) within the inner cavity 114. The bracket mounting locations 200 are circumferentially spaced about a center axis 202 (FIG. 14) of its corresponding secondary cable tube 80. Each bracket mounting location 200 includes a resilient latch 144 positioned between two bracket retention pockets 145 (see FIGS. 21-23). Adjacent bracket mounting locations 200 share the bracket retention pockets 145 provided therein between Referring to FIGS. 27-31, the secondary cable anchoring brackets 112 are depicted as having a stamped metal/bent sheet metal construction. Of course, other materials (e.g., molded plastic) could be used as well. In certain embodiments, the secondary cable anchoring brackets 112 can include a main central body 162 and two side flanges 166 oriented at oblique angles relative to the central body 162 (see FIG. 28). The main central body 162 and the side flanges 166 are all elongated along a central axis 160 (FIG. 29). The angling of the side flanges 166 relative to the main central body 162 provides a first side 163 of the secondary cable anchoring bracket 112 with a generally concave shape and an opposite second side 165 of the secondary cable anchoring bracket 112 with a generally convex shape.

Figure 27:
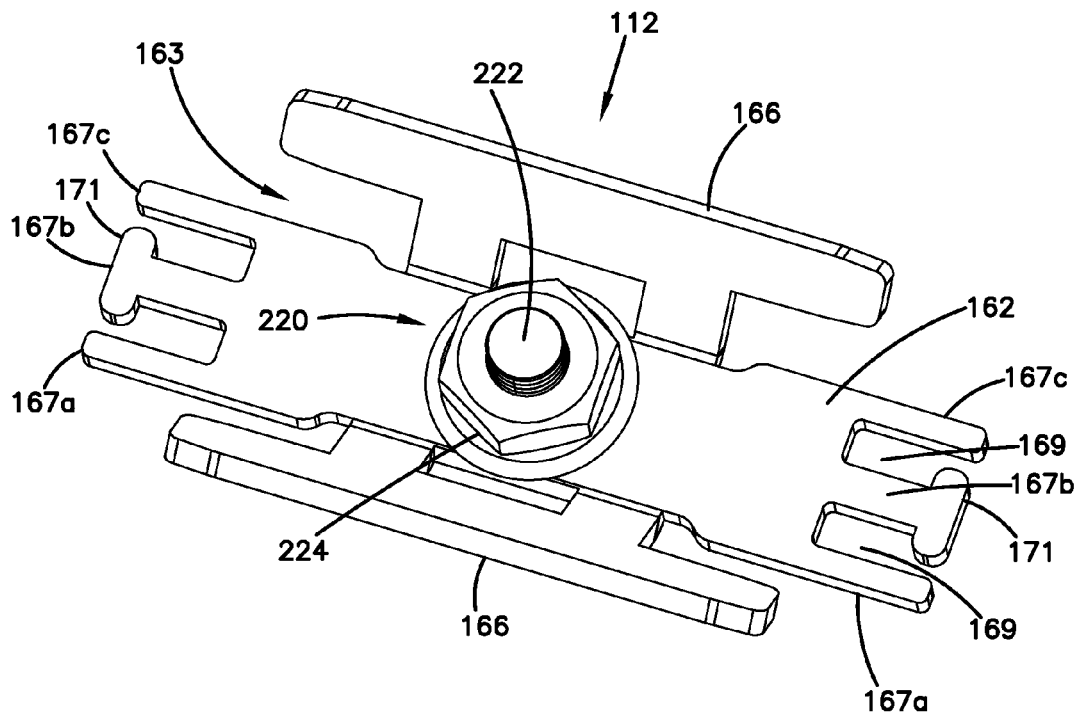
FIG. 27 is a perspective view of a cable anchoring bracket that is part of the secondary cable tube assembly of FIG. 8.
Figure 32:
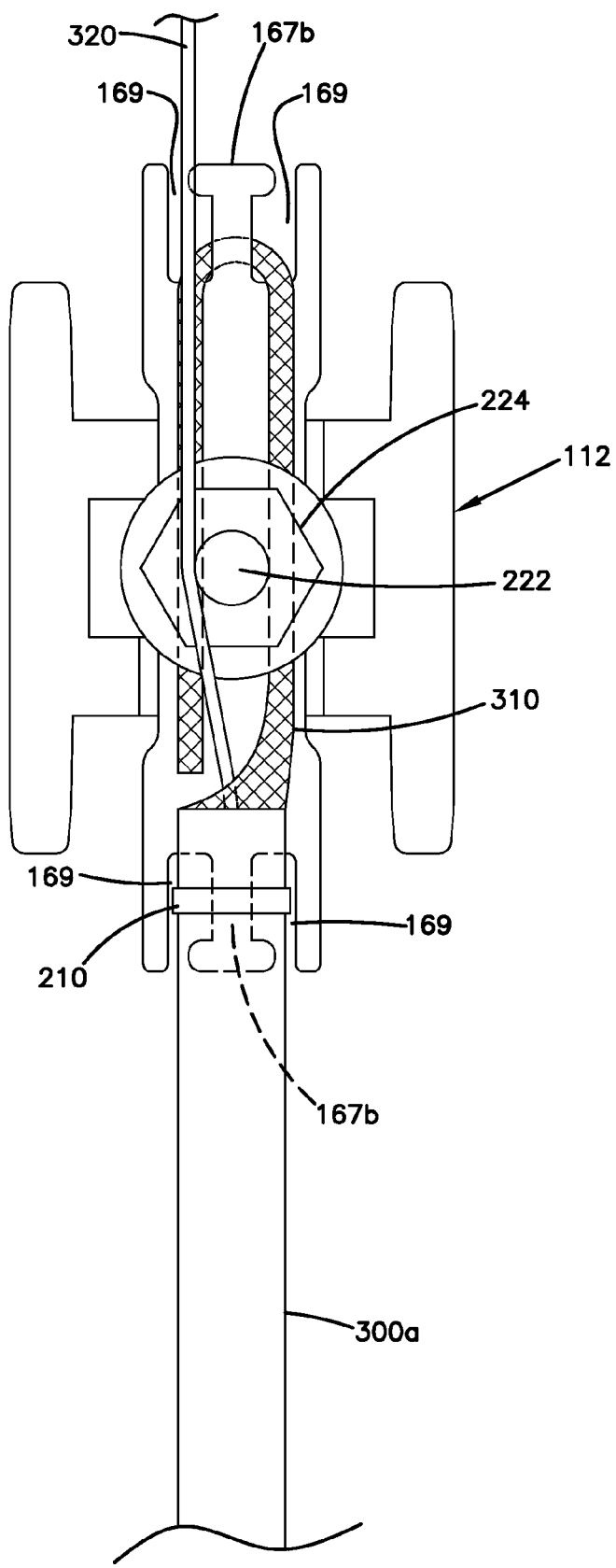
FIG. 32 shows the cable anchoring bracket of FIG. 27 with a round drop cable anchored thereto.
Figure 33:
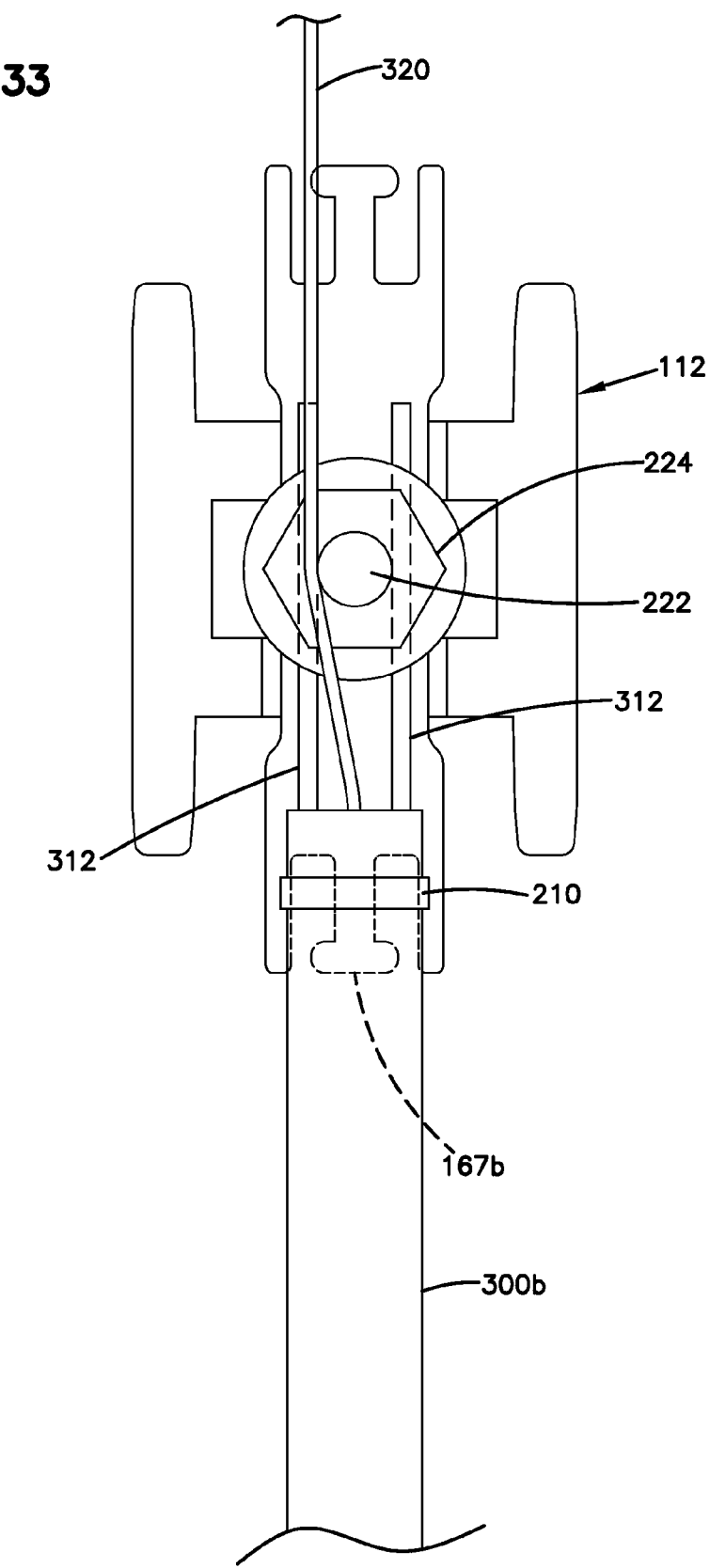
FIG. 33 shows the cable anchoring bracket of FIG. 27 with a flat drop cable anchored thereto.

The main central body 162 includes three axial extensions 167a-167c at each end (FIG. 27). The axial extensions 167a-167c are generally parallel and are separated by axial slots 169. Each central axial extension 167b includes has crosspiece 171 at its end such that the axial extensions 167b are generally T-shaped. The axial extensions 167a-167c are one example of a configuration for a cable-tie down location that can be provided on the cable anchoring brackets 112. As shown in FIGS. 32 and 33, a tie down member 210 (e.g., a strap) can be routed through the axial slots 169 and used to secure a cable (e.g., a round cable 300a as shown at FIG. 32 or a flat cable 300b as shown at FIG. 33) to the central axial extension 167b. The tie down member can be cinched or otherwise tightened down about an outer jacket of the cable.

Figure 28:
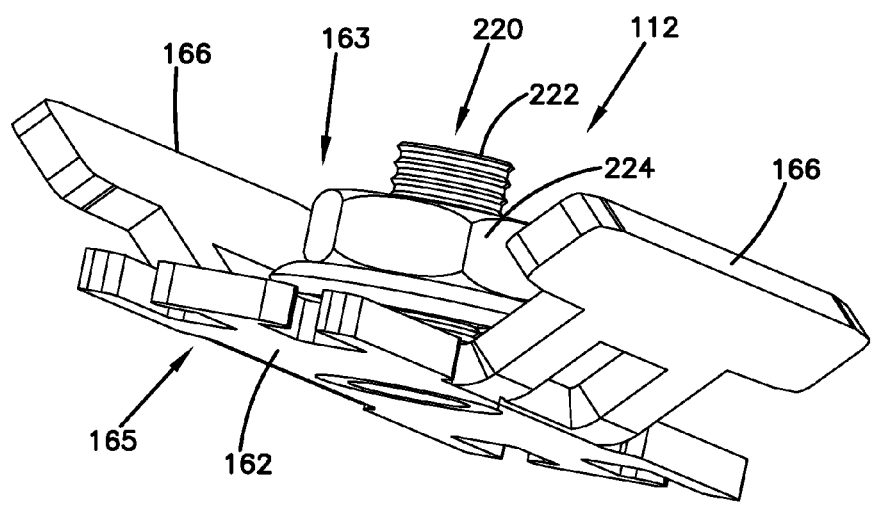
FIG. 28 is another perspective view of the cable anchoring bracket of FIG. 27.
Figure 29:
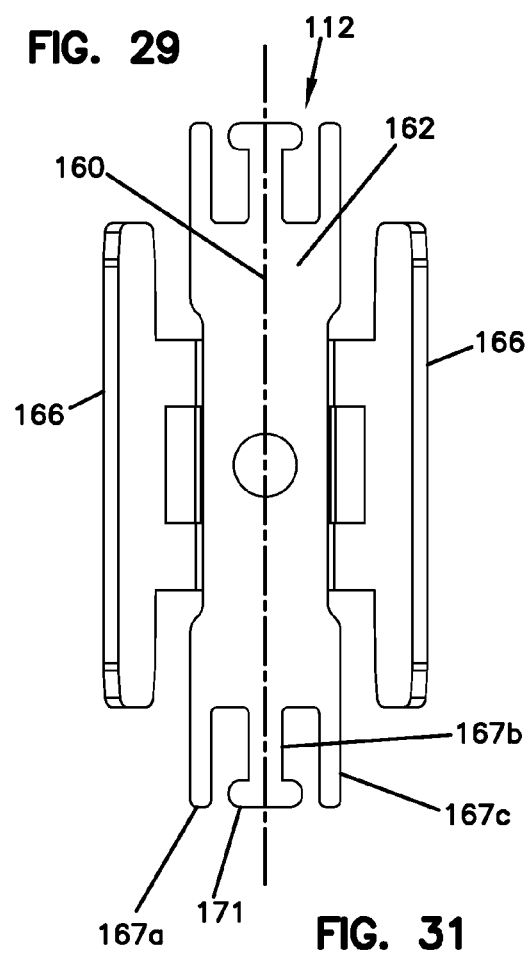
FIG. 29 is a plan view of the cable anchoring bracket of FIG. 27 with the fastener removed.
Figure 30:
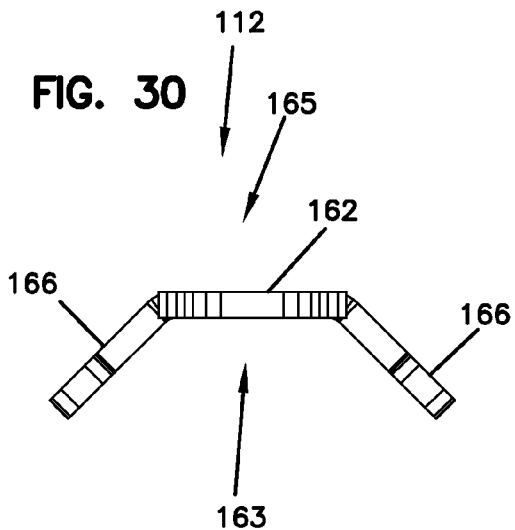
FIG. 30 is an end view of the cable mounting bracket of FIG. 29.
Figure 31:
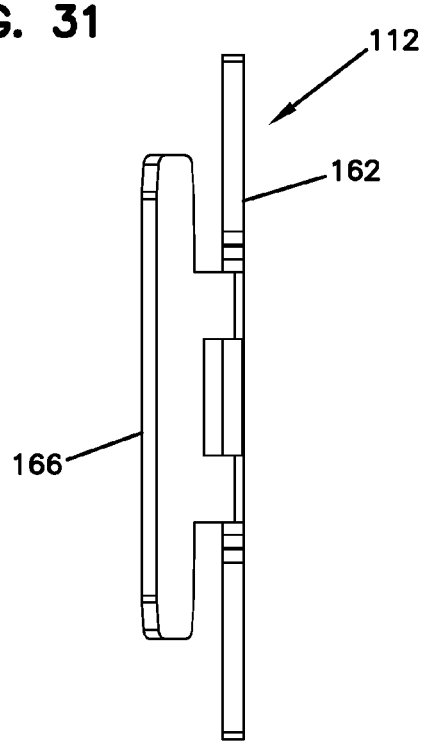
FIG. 31 is a side view of the cable mounting bracket of FIG. 29.

Referring to FIGS. 27 and 28, each secondary cable anchoring bracket 112 includes a strength member clamping structure 220 (e.g., a bolt or other fastener) provided at the main central body 162. In the example shown, the clamping structure 220 includes a threaded stud 222 secured to the main central body 162 and a clamping nut 224 that threads onto the threaded stud 222. Preferably the threaded stud 222 projects outwardly from the generally concave side 163 of the secondary cable anchoring bracket 112. Referring to FIG. 32, a strength layer 310 (e.g., a layer of aramid yarn) from the cable 300a can be routed along a path that extends: (a) from the tied-down jacket of the cable 300a to a location under the clamping nut 224; (b) from the clamping nut 224 to the extension 167b; (c) through the slots 169 and around the extension 167b; and d) from the extension 167b back under the clamping nut 224 on an opposite side of the threaded stud 222. By threading the clamping nut 224 down on the stud 222, the strength layer 310 can be clamped between the clamping nut 224 and the main central body 162 of the secondary cable anchoring bracket 112 to provide cable anchoring. Referring to FIG. 33, strength members 312 (e.g., epoxy rods reinforced by glass fibers) of the cable 300b can be routed from the tied-down jacket of the cable 300b to locations beneath the clamping nut 224 on opposite sides of the threaded stud 222. By threading the clamping nut 224 down on the stud 222, the strength members 312 can be clamped between the clamping nut 224 and the main central body 162 of the secondary cable anchoring bracket 112 to provide cable anchoring. A buffered fiber 320 (e.g., a tight or loose buffered optical fiber) can be routed from the jacketed cable 300a, 300b along the length of the bracket 112 (see FIGS. 32 and 33).

Referring back to FIGS. 10-12, the secondary cable anchoring brackets 112 mount within the inner passage 114 of the secondary cable anchoring housing 110 with the generally convex sides 163 facing toward a central axis of the secondary cable tube 80 and the generally concave sides 165 facing away from the central axis of the secondary cable tube 80. The latches 144 (FIGS. 21-22) of the secondary cable anchoring housing 110 engage the fasteners of the secondary cable anchoring brackets 112 to retain the secondary cable anchoring brackets 112 within the inner passage 114 (see FIGS. 11A and 12). The side flanges of the secondary cable anchoring brackets 112 fit within corresponding pockets defined by the secondary cable anchoring housing 110 (see FIG. 11B). The secondary cable anchoring brackets 112 nest relative to one another within the inner passage 114 to further limit movement of the secondary cable anchoring brackets 112 relative to the secondary cable anchoring housing 110 (see FIG. 10).

Referring back to FIGS. 10-12, the secondary cable anchoring brackets are adapted to be mounted within the inner cavity 114 of the secondary cable anchoring housing 110. Specifically, the secondary cable anchoring brackets 112 each mount at a corresponding one of the four anchor bracket mounting locations 200 defined within the inner cavity 114. When mounted at the bracket mounting locations 200, the secondary cable anchoring brackets 112 are oriented with the generally convex second sides 165 facing toward the center axis 202 (FIG. 14) of the corresponding secondary cable tube 80 and the concave first sides 163 facing away from the center axis 202 (see FIG. 10). As so mounted, the concave first sides 163 define separate fiber/cable routing paths within the inner cavity 114 through which optical fibers (e.g., tight or loose buffered optical fibers) can be routed. In other embodiments, optical fibers can be routed through the central region defined by the convex second sides 165 of the secondary cable anchoring brackets 112.

When the secondary cable anchoring brackets 112 are inserted into their corresponding bracket mounting locations 200, lower ends of the side flanges 166 fit within the bracket retention pockets 145. When the secondary cable anchoring brackets 112 have been fully inserted within the bracket mounting locations 200, the resilient latches 144 snap over the threaded studs 222 to retain the secondary cable anchoring brackets 112 at their corresponding bracket mounting locations 200 (see FIG. 12). As noted above, the secondary cable anchoring brackets 112 nest relative to one another within the inner cavity 114 to further limit movement of the secondary cable anchoring brackets 112 relative to the secondary cable anchoring housing 110.

In use, the enclosure 20 is configured such that a secondary cable such as a drop cable can be added to the enclosure 20 without having to de-pressurize the primary sealant assembly 70. To add a secondary cable, a field technician removes the clamp 32 and disengages the dome 30 from the base 28. The technician then de-pressurizes the secondary sealant volume 90 corresponding to the secondary cable sealant assembly 88 through which the secondary cable is intended to be routed. Once the secondary sealant volume 90 has been de-pressurized, a plug corresponding to one of the secondary cable through-ports 92 is removed and the secondary cable is inserted axially through the secondary cable through-port 92. The secondary cable is pushed through the secondary cable tube 80 to provide a sufficient length of cable within the enclosure 20 for subsequent processing. Next, the jacket of the cable is stripped and the optical fiber is accessed for splicing or connectorization. One of the secondary cable anchoring brackets 112 is then removed from its corresponding secondary cable anchoring housing 110 and a jacketed portion of the cable is secured (e.g., tied down) to the bracket 112. Subsequently, a strength member of the cable is accessed and clamped to the secondary cable anchoring bracket 112 by the clamping structure 220. Once the cable has been effectively anchored to the secondary cable anchoring bracket 112, the secondary cable anchoring bracket 112 is snapped back into its corresponding bracket mounting location 200 and retained in place by the resilient latch 144 corresponding to the mounting location 200. Thereafter, the secondary sealant volume 90 is re-pressurized and the dome 30 is re-attached to the base 20.

From the foregoing detailed description, it will be evident that modifications and variations can be made in the devices of the disclosure without departing from the spirit or scope of the invention.

What is claimed is:

1. A cable sealing and cable anchoring system comprising:
   a primary sealant assembly including a primary volume of sealant that defines a plurality of primary through-ports that pass through the primary sealant assembly, the primary sealant assembly including a primary actuator for pressurizing the primary volume of sealant;
   a secondary cable tube that mounts within one of the primary cable through-ports, the secondary tube including a first end a second end;
   a secondary cable sealant assembly that mounts within the first end of the secondary cable tube, the secondary cable sealant assembly including a secondary sealant volume defining a plurality of secondary cable through-ports that extend through the secondary cable sealant assembly, the secondary cable sealant assembly also including a secondary actuator for pressurizing the secondary sealant volume; and
   a cable anchoring assembly for anchoring a strength member of a secondary cable routed through the secondary cable tube to the secondary cable tube, the cable anchoring assembly being supported by the secondary cable tube adjacent the second end of the secondary cable tube.

2. The cable sealing and anchoring system of claim 1, wherein the cable anchoring assembly includes a clamping structure for anchoring the strength member.

3. The cable sealing and anchoring of claim 2, wherein the cable anchoring assembly also includes a cable tie-down location.

4. The cable sealing and anchoring system of claim 2, wherein the cable anchoring assembly also includes first and second spaced-apart cable tie-down locations, the clamping structure being positioned between the first and second cable tie-down locations.

5. The cable sealing and anchoring system of claim 2, wherein the cable anchoring assembly includes a strength member loop-back structure, wherein the strength member is routed from the clamping structure to the strength member loop-back structure and then looped back to the clamping structure such that the strength member can be clamped at two locations by the clamping structure.

6. The cable sealing and anchoring system of claim 1, wherein the cable anchoring assembly includes an anchoring bracket secured in place relative to the drop tube by a snap-fit connection.

7. The cable sealing and anchoring system of claim 6, wherein the cable anchoring bracket includes a clamping structure for clamping the strength member.

8. The cable sealing and anchoring system of claim 7, wherein the cable anchoring bracket includes at least one cable tie-down location.

9. The cable sealing and anchoring system of claim 8, wherein the cable anchoring bracket includes a plate having a main body that is elongated along a central axis, wherein the clamping structure is provided on the main body, and wherein the cable tie-down location is provided by a T-shaped projection that projects outwardly from one end of the main body in a direction along the central axis.

10. The cable sealing and anchoring system of claim 1, wherein the cable anchoring assembly includes a cable anchoring housing that mounts to the second end of the secondary cable tube and a plurality of cable anchoring brackets that mount to the cable anchoring housing.

11. The cable sealing and anchoring system of claim 10, wherein the cable anchoring housing is secured to the secondary cable tube by a snap-fit connection and the cable anchoring brackets are secured to the cable anchoring housing by snap-fit connections.

12. The cable sealing and anchoring system of claim 11, wherein each of the cable anchoring brackets includes a strength member clamping structure and a cable tie-down location.

13. The cable sealing and anchoring system of claim 10, wherein the system is incorporated into an enclosure having a main bracket that is anchored to the enclosure, and wherein the cable anchoring housing attaches to the main bracket.

14. The cable sealing and anchoring system of claim 13, wherein the main bracket defines a plurality of pockets defined by pocket-defining edges, and wherein the cable anchoring housing fits within one of the pockets and defines a groove structure that receives the pocket-defining edges.

15. The cable sealing and anchoring system of claim 1, wherein the system is incorporated into an enclosure including a dome having an open end and a base that mounts at the open end of the dome, wherein the primary sealant assembly mounts within the base, and wherein the primary and secondary cable through-ports provide sealed cable access to an interior of the housing.

16. The cable sealing and anchoring system of claim 15, wherein the enclosure has a main bracket that is anchored to the enclosure, wherein the main bracket defines a plurality of pockets defined by pocket-defining edges, wherein the pockets align with the primary through-ports, and wherein the cable anchoring housing fits within one of the pockets and defines a groove structure that receives the pocket-defining edges.

17. An enclosure comprising:
- a housing including a dome having an open end and a base that is secured to the open end of the dome;
- a primary sealant assembly that mounts within the base, the primary sealant assembly including a primary volume of sealant that defines a plurality of primary through-ports that pass through the primary sealant assembly to provide sealed primary cable access to an interior of the housing, the primary sealant assembly including a primary actuator for pressurizing the primary volume of sealant;
- a secondary cable tube that mounts within one of the primary cable through-ports, the secondary tube including a first end a second end, the first end of the secondary cable tube being positioned outside the housing when the secondary cable tube is mounted within the primary cable through-port, the second end of the secondary cable through-port being positioned inside the housing when the secondary cable tube is mounted within the primary cable through-port;
- a secondary cable sealant assembly that mounts within the first end of the secondary cable tube, the secondary cable sealant assembly including a secondary sealant volume defining a plurality of secondary cable through-ports that extend through the secondary cable sealant assembly to provide sealed secondary cable access to the interior of the housing, the secondary cable sealant assembly also including a secondary actuator for pressurizing the secondary sealant volume; and
- a cable anchoring assembly for anchoring a strength member of a secondary cable routed through the secondary cable tube to the secondary cable tube, the cable anchoring assembly being carried by the second end of the secondary cable tube.

* * * * *